(12) United States Patent
Yoshioka et al.

(10) Patent No.: US 9,008,388 B2
(45) Date of Patent: Apr. 14, 2015

(54) INFORMATION PROCESSING SYSTEM AND INFORMATION PROCESSING METHOD

(75) Inventors: Shigeatsu Yoshioka, Kanagawa (JP); Kenji Yamane, Kanagawa (JP); Naoki Tagami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/878,780

(22) PCT Filed: Jul. 12, 2012

(86) PCT No.: PCT/JP2012/004510
§ 371 (c)(1),
(2), (4) Date: Apr. 11, 2013

(87) PCT Pub. No.: WO2013/031077
PCT Pub. Date: Mar. 7, 2013

(65) Prior Publication Data
US 2013/0194312 A1    Aug. 1, 2013

(30) Foreign Application Priority Data
Aug. 26, 2011    (JP) ................. 2011-184895

(51) Int. Cl.
*G06K 9/00* (2006.01)
*G06T 7/00* (2006.01)
*G02B 21/36* (2006.01)
*G06F 3/0485* (2013.01)

(52) U.S. Cl.
CPC ............ *G06T 7/0042* (2013.01); *G02B 21/365* (2013.01); *G06F 3/0485* (2013.01); *G06T 7/003* (2013.01); *G09G 2380/08* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS 4,836,667 A * 6/1989 Ozeki ........................... 359/389
6,101,265 A * 8/2000 Bacus et al. .................. 382/133
(Continued)

FOREIGN PATENT DOCUMENTS

JP    62-269924    11/1987
JP    2002-229537    8/2002
(Continued)

OTHER PUBLICATIONS

Chinese Office Action issued Jun. 24, 2014, for corresponding Chinese Appln. No. 201280003405X.

*Primary Examiner* — David H Chu
(74) *Attorney, Agent, or Firm* — K&L Gates LLP

(57) ABSTRACT

[Object] To provide an information processing apparatus and an information processing method more excellent in convenience for the user.
[Solving Means] An information processing system according to a first aspect of the present technology includes: an acquisition unit to acquire image data obtained by capturing a slide on which a plurality of sections obtained by cutting a single specimen in the same direction are discretely placed; a detector to detect a plurality of specimen areas in the acquired image data and to calculate position information relatively indicating positions of the individual specimen areas in a coordinate space of the image data, the plurality of specimen areas having the same shape and including the individual sections; a first storage unit to store the calculated position information; and a controller to switch display between the specimen areas based on the stored position information.

9 Claims, 16 Drawing Sheets

(56) References Cited

U.S. PATENT DOCUMENTS

Figure 1:
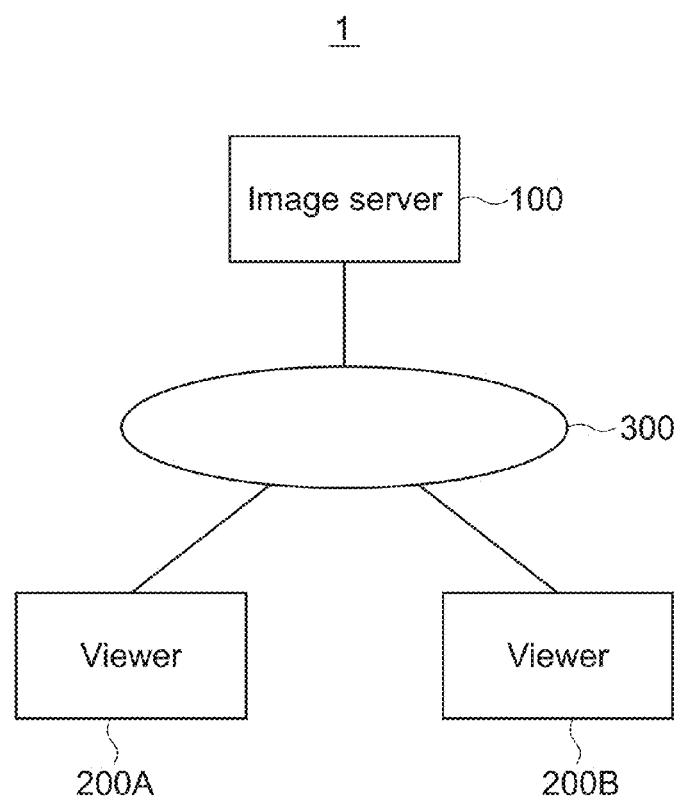

| | | |
|---|---|---|
| 6,345,111 B1 * | 2/2002 | Yamaguchi et al. .......... 382/118 |
| 6,633,655 B1 * | 10/2003 | Hong et al. .................. 382/118 |
| 7,808,555 B2 * | 10/2010 | Aratani et al. ................ 348/578 |
| 7,940,998 B2 * | 5/2011 | Doerrer ........................ 382/286 |
| 2002/0090127 A1 * | 7/2002 | Wetzel et al. ................ 382/133 |
| 2003/0039384 A1 * | 2/2003 | Bacus et al. ................. 382/128 |
| 2004/0021911 A1 * | 2/2004 | Corson et al. ................ 358/463 |
| 2004/0136582 A1 | 7/2004 | Bacus et al. |
| 2006/0109343 A1 * | 5/2006 | Watanabe et al. ............. 348/79 |
| 2008/0136815 A1 | 6/2008 | Matsumoto |
| 2010/0214321 A1 * | 8/2010 | Hokkanen et al. ............ 345/660 |
| 2010/0253774 A1 | 10/2010 | Yoshioka et al. |
| 2011/0154196 A1 * | 6/2011 | Icho et al. .................... 715/702 |
| 2012/0263739 A1 * | 10/2012 | Langer et al. ............... 424/178.1 |

FOREIGN PATENT DOCUMENTS

| | | |
|---|---|---|
| JP | 2003-161893 | 6/2003 |
| JP | 2007-024927 | 2/2007 |
| JP | 2008-142417 | 6/2008 |
| JP | 2010-243597 | 10/2010 |

* cited by examiner

INFORMATION PROCESSING SYSTEM AND INFORMATION PROCESSING METHOD

CROSS REFERENCES TO RELATED APPLICATIONS

The present application is a national stage of International Application No. PCT/JP2012/004510 filed on Jul. 12, 2012 and claims priority to Japanese Patent Application No. 2011-184895 filed on Aug. 26, 2011, the disclosure of which is incorporated herein by reference.

BACKGROUND

The present technology relates to an information processing system and an information processing method that control display of image data obtained by a microscope in the fields of medical treatment, pathology, biological discipline, materials, and the like.

In the fields of medical treatment, pathology, and the like, there is proposed a system in which an image of a section of a cell, a tissue, an organ, or the like of a living body that is obtained by an optical microscope is digitalized and the section is inspected or a patient is diagnosed by a doctor, a pathologist, or the like based on the digital image.

For example, in a method described in Patent Document 1, an image optically obtained by a microscope is digitalized by a video camcorder installing a CCD (Charge Coupled Device) therein, and the digital signal is inputted into a control computer system and visualized on a monitor. The pathologist performs an inspection and the like while viewing the image displayed on the monitor (e.g., see paragraphs [0027] and [0028] and FIG. 5 of Patent Document 1).

Patent Document 1: Japanese Patent Application Laid-open No. 2009-37250

SUMMARY

Problem to be Solved by the Invention

In the case where a section is imaged using an optical microscope, a section is placed on a glass slide to fabricate a prepared slide. However, in the case where a number of sections are imaged, for example, a plurality of sections may be, in some cases, placed on a single glass slide for reasons of efficiency in fabrication of a prepared slide, saving of glass slides, and the like. When the glass slide on which the plurality of sections are placed in this manner is entirely imaged, only an integrate image as the entire glass slide is obtained, and each of images of the individual sections is not obtained. Therefore, it is difficult to separately handle the images of the individual sections. There is a fear that a convenience for the user is deteriorated.

On the other hand, if a plurality of sections placed on a glass slide are individually imaged, each of images of the individual sections can be obtained. Therefore, it is possible to separately handle the images of the individual sections. However, for example, in the case where a plurality of sections obtained by slicing a single specimen a plurality of times are placed on a single glass slide, it is difficult to handle images of the individual sections individually imaged with the images being associated with each other. There is a fear that a convenience for the user is deteriorated.

In view of the above-mentioned circumstances, it is an object of the present technology to provide an information processing apparatus and an information processing method more excellent in convenience for a user.

Means for Solving the Problem

In order to solve the above-mentioned problem, an information processing system according to a first aspect of the present technology includes: an acquisition unit to acquire image data obtained by capturing a slide on which a plurality of sections obtained by cutting a single specimen in the same direction are discretely placed; a detector to detect a plurality of specimen areas in the acquired image data and to calculate position information relatively indicating positions of the individual specimen areas in a coordinate space of the image data, the plurality of specimen areas having the same shape and including the individual sections; a first storage unit to store the calculated position information; and a controller to switch display between the specimen areas based on the stored position information.

That is, the controller switches display between the specimen areas based on the position information being metadata. With this, the controller can jump areas other than the specimen areas and switch display between the specimen areas irrespective of the fact that the image data acquired by the acquisition unit is the image data obtained by capturing the slide itself on which the plurality of sections are placed. Further, by recording the specimen area as the position information being the metadata, the first storage unit can switch display between the specimen areas efficiently and at high speed. In addition, using the position information being the metadata, even if the plurality of specimen areas are arranged in image data of a plurality of slides, the display processing can be efficiently performed as in the case where a plurality of specimen areas detected from single image data are displayed in order.

The information processing system may further include a generator to generate reduced data by reducing a resolution of the image data, in which the detector may detect the plurality of specimen areas in the image data by detecting the plurality of specimen areas from the reduced data.

That is, by the generator detecting the specimen area from the reduced data having lowered resolution, the specimen area can be detected efficiently and at high speed.

A plurality of image data items of the plurality of specimen areas may be managed in a cutting order, and the controller may calculate, when the controller receives, from a user, specification of the specimen area to be displayed in the acquired image data and a range in the specimen area, the range in the specified specimen area as a display area, and may switch, when the display area is located at an end of the specimen area and the controller receives, from the user, an instruction for moving the display area outside the end, to display the neighbor specimen area in the cutting order based on the stored position information.

That is, even if the display area of part of the specimen area is displayed, it is possible to jump the areas other than the specimen areas and switch display between the specimen areas.

The controller may switch, when the calculated display area is located at an end of the specimen area in one axial direction of the plurality of specimen areas in the coordinate space of the image data and the controller receives, from the user, an instruction for moving the display area outside the end in the one axial direction, to display a neighbor specimen area in the cutting order while fixing a position in the other axial direction.

With this, a position of the display area in the specimen area at the moving destination corresponds to a position of the display area in the specimen area at a moving source at the moving destination. Therefore, a convenience for the user can be provided.

The acquisition unit may acquire image data obtained by capturing a slide on which a plurality of sections obtained by cutting a single specimen in the same direction are arranged and placed discretely and in one row, and the controller may calculate, when the calculated display area is located at an end of the specimen area in an arrangement direction of the plurality of specimen areas in a coordinate space of the image data and the controller receives, from a user, an instruction for moving the display area beyond the end in the arrangement direction, a display area of the specimen area in the moving destination based on the stored position information.

With this, even when the plurality of specimen areas arranged in the one row are displayed, display can be switched between the specimen areas, jumping the areas other than the specimen areas.

The information processing system may further include: an alignment unit to detect feature points of the plurality of specimen areas and to calculate an offset amount between coordinates of the feature points in a coordinate space of the specimen area; and a second storage unit to store the calculated offset amount, in which the controller may calculate, when the controller receives, from a user, an instruction for jumping the display area to another specimen area, the display area at a jumping destination based on the stored position information and the stored offset amount such that positions of the feature points correspond to each other in the display area before and after jumping.

That is, the alignment unit sets the display area based on the offset amount between the feature points included in the plurality of specimen areas that is the metadata, and hence the controller can cause the positions of the feature points to correspond to each other in the display area before and after jumping. Further, by using the metadata for setting the display area, it is possible to accurately calculate the corresponding display area and perform the display processing efficiently and at high speed.

The alignment unit may calculate an affine transformation matrix for causing the detected feature points in the plurality of specimen areas to correspond to each other in a display space, and may calculate the offset amount based on the calculated affine transformation matrix.

By using the affine transformation matrix, it is possible to calculate an offset amount in two axial directions. With this, it is possible to more accurately calculate the corresponding display area before and after jumping.

The controller may divide, when the controller receives, from a user, specification of a plurality of specimen areas to be displayed in the obtained image data, a display space into display spaces as many as the plurality of specified specimen areas, and calculates, based on the stored position information and the stored offset amount, the display area to be displayed in the plurality of display spaces such that positions of the feature points in the specimen areas to be displayed in the plurality of display spaces correspond to each other.

That is, based on the offset amount between the feature points included in the plurality of specimen areas that is the metadata, the controller can cause the positions of the feature points in the specimen areas to be displayed in the plurality of display spaces to correspond to each other. Further, by using the metadata for setting the display area, it is possible to accurately calculate the corresponding display area and perform display processing efficiently and at high speed.

An information processing method according to a second aspect according to the present technology includes: acquiring, by an acquisition unit, image data obtained by capturing a slide on which a plurality of sections obtained by cutting a single specimen in the same direction are discretely placed; detecting, by a detector, a plurality of specimen areas in the acquired image data and calculating position information relatively indicating positions of the individual specimen areas in a coordinate space of the image data, the plurality of specimen areas having the same shape and including the individual sections; storing, by a first storage unit, the calculated position information; and switching, by a controller, display between the specimen areas based on the stored position information.

Effect of the Invention

As mentioned above, according to the present technology, it is possible to provide an information processing apparatus and an information processing method more excellent in convenience for a user.

Additional features and advantages are described herein, and will be apparent from the following Detailed Description and the figures.

BRIEF DESCRIPTION THE FIGURES

FIG. 1 A view showing a configuration of an information processing system according to an embodiment of the present technology.

Figure 2:
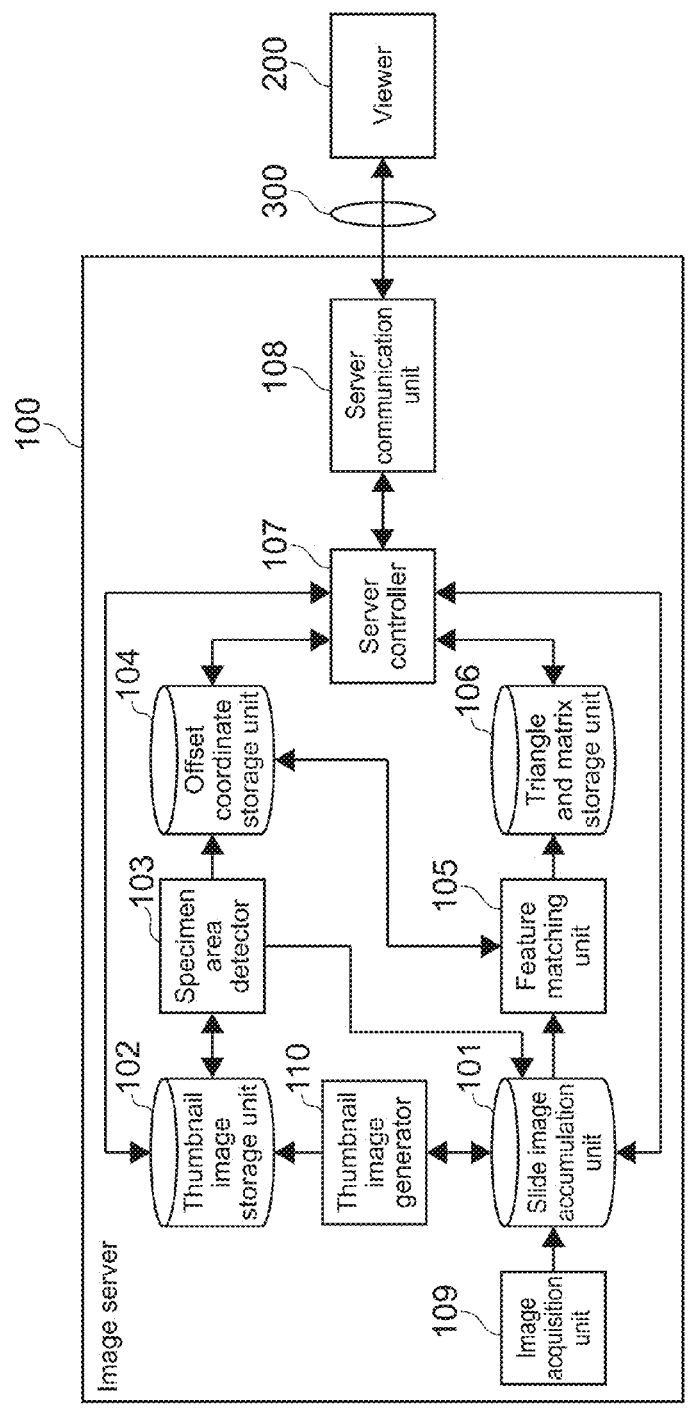

FIG. 2 A view showing functional configurations of an image server realized using a typical computer system.

Figure 3:
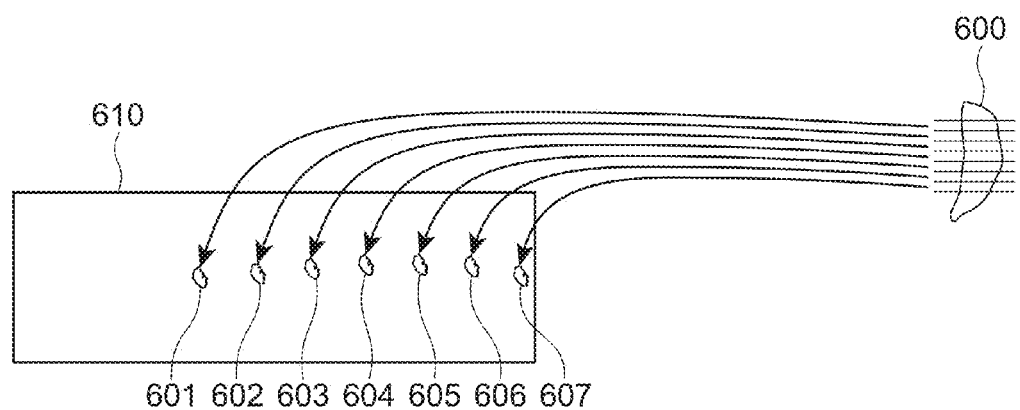

FIG. 3 A view for explaining a slide image.

Figure 4:
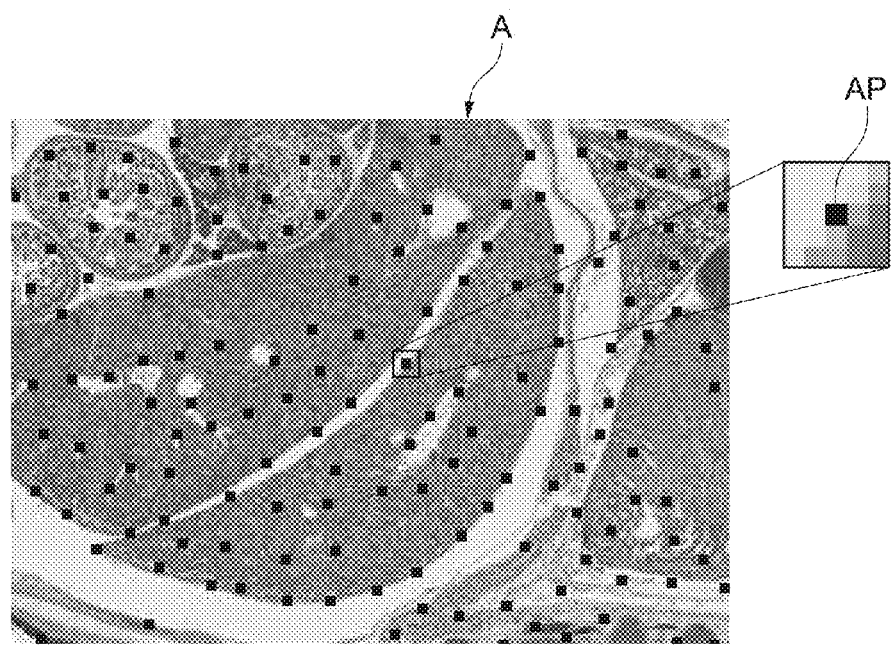

FIG. 4 A view for explaining feature matching.

Figure 5:
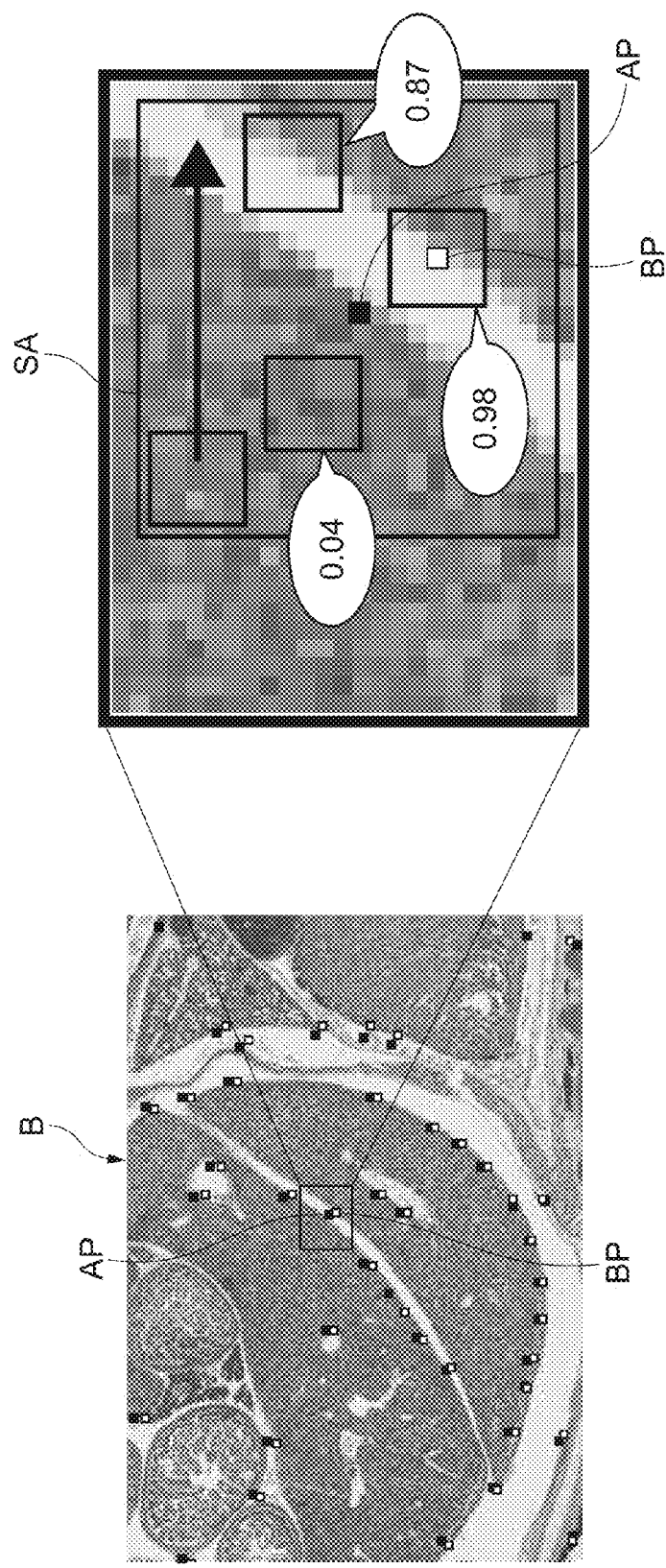

FIG. 5 A view for explaining the feature matching.

Figure 6:
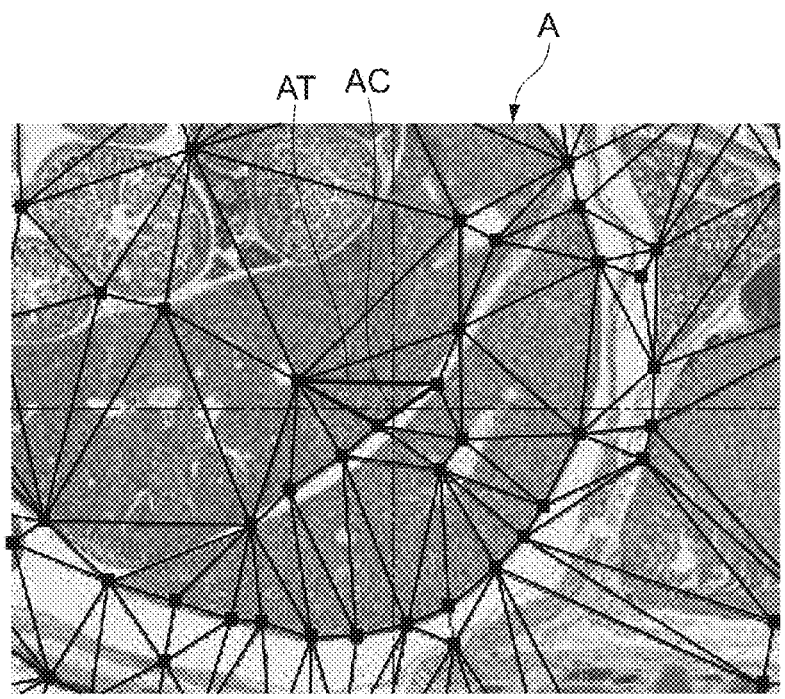

FIG. 6 A view for explaining the feature matching.

Figure 7:
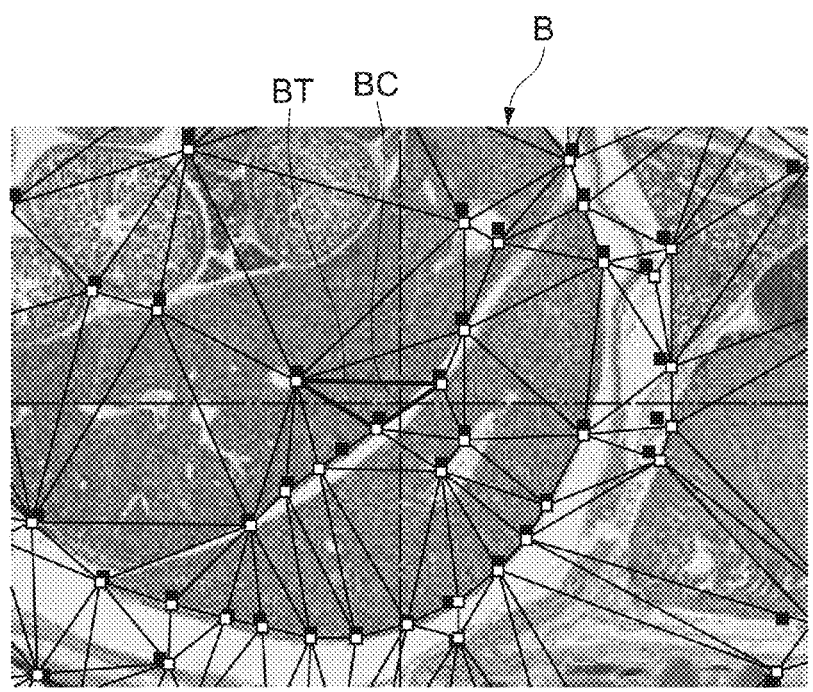

FIG. 7 A view for explaining the feature matching.

Figure 8:
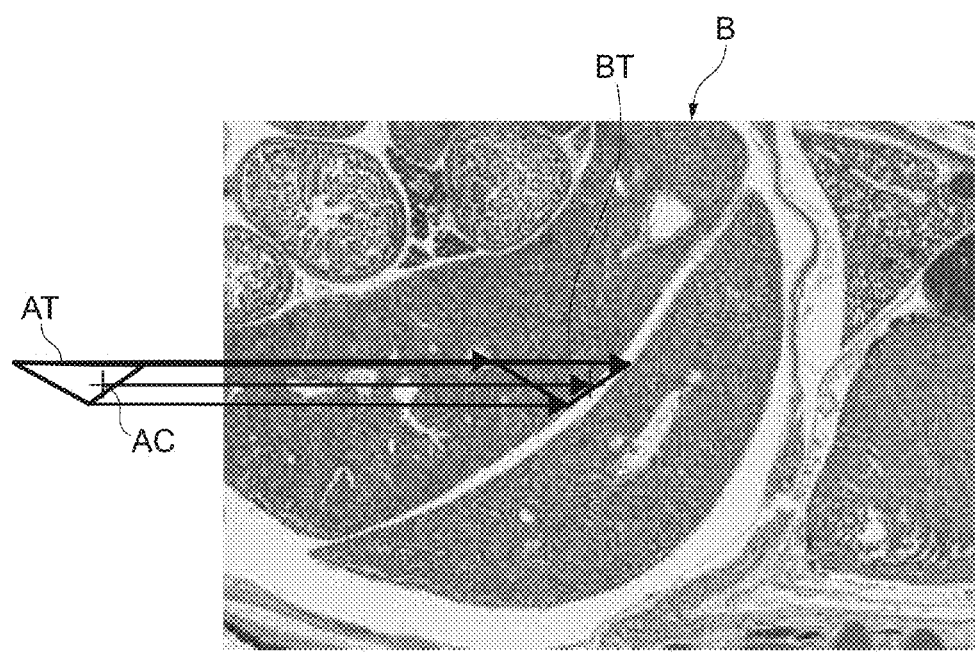

FIG. 8 A view for explaining the feature matching.

Figure 9:
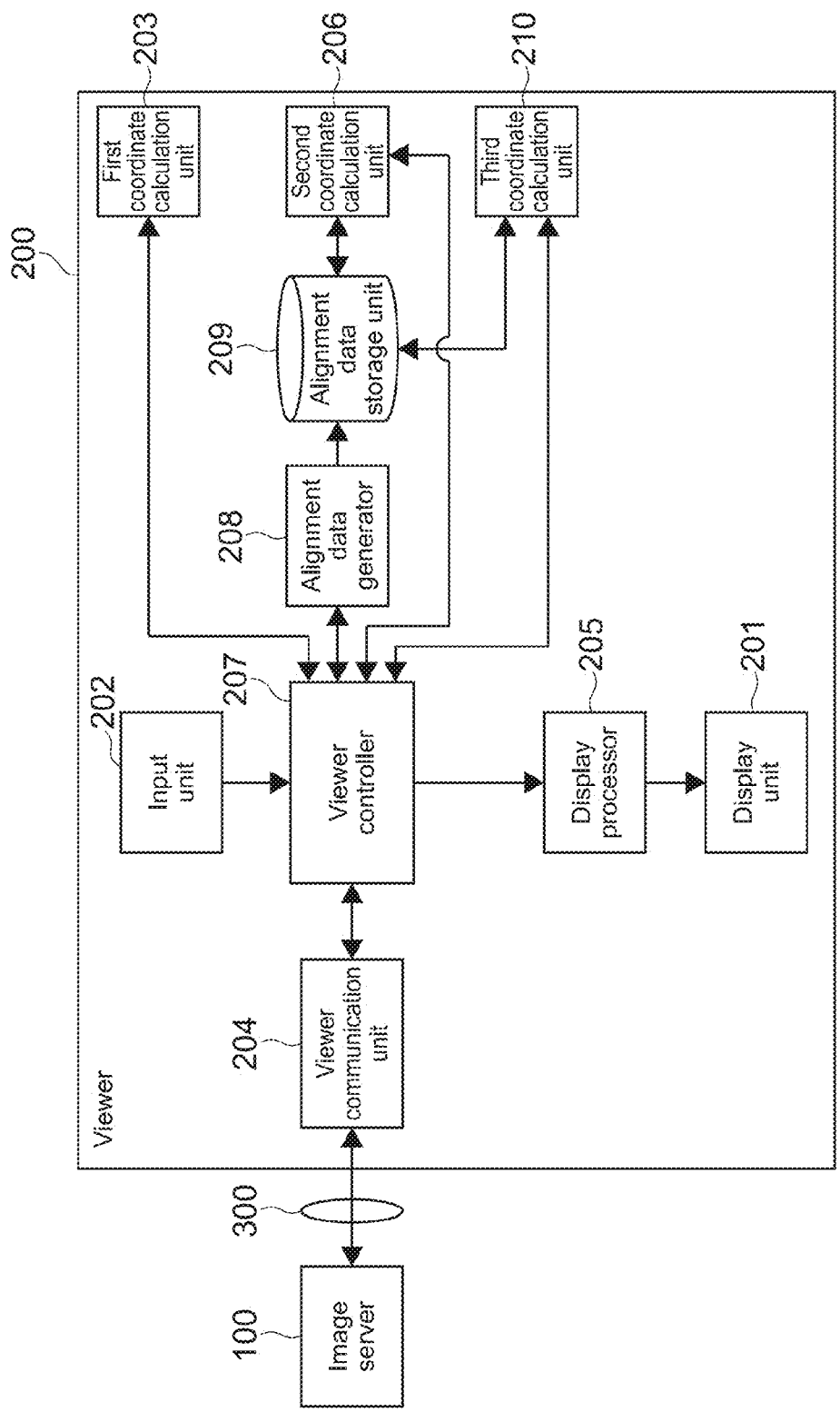

FIG. 9 A view showing functional configurations of a viewer realized using the typical computer system.

Figure 10:
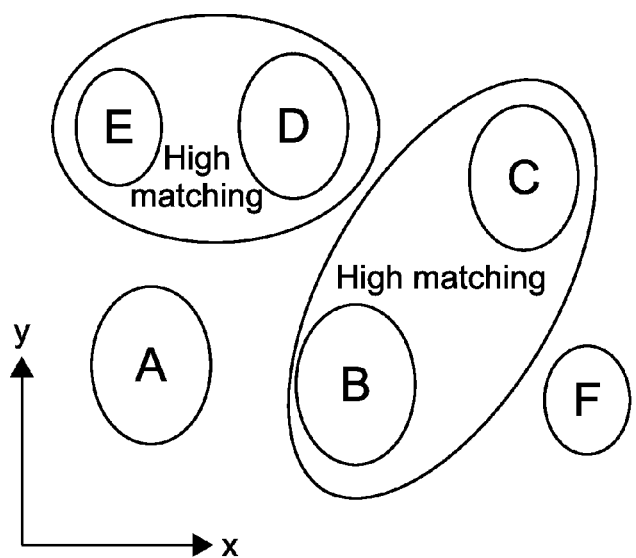

FIG. 10 A view for explaining setting of the numbers of specimen areas.

Figure 11:
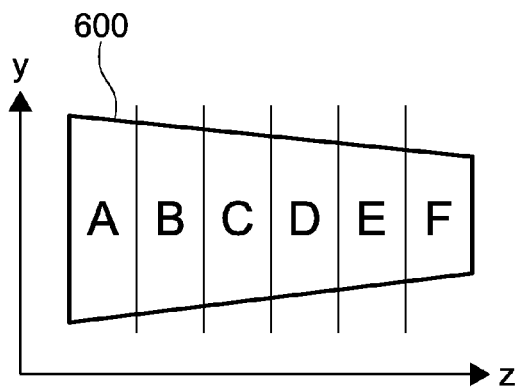

FIG. 11 A view for explaining the setting of the numbers of the specimen areas.

Figure 12:
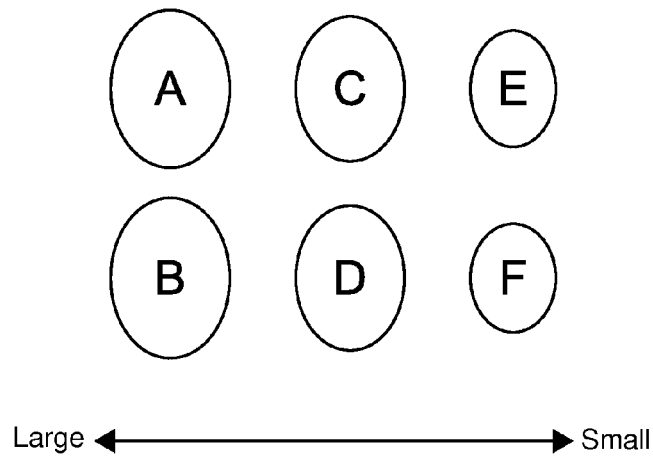

FIG. 12 A view for explaining the setting of the numbers of the specimen areas.

Figure 13:
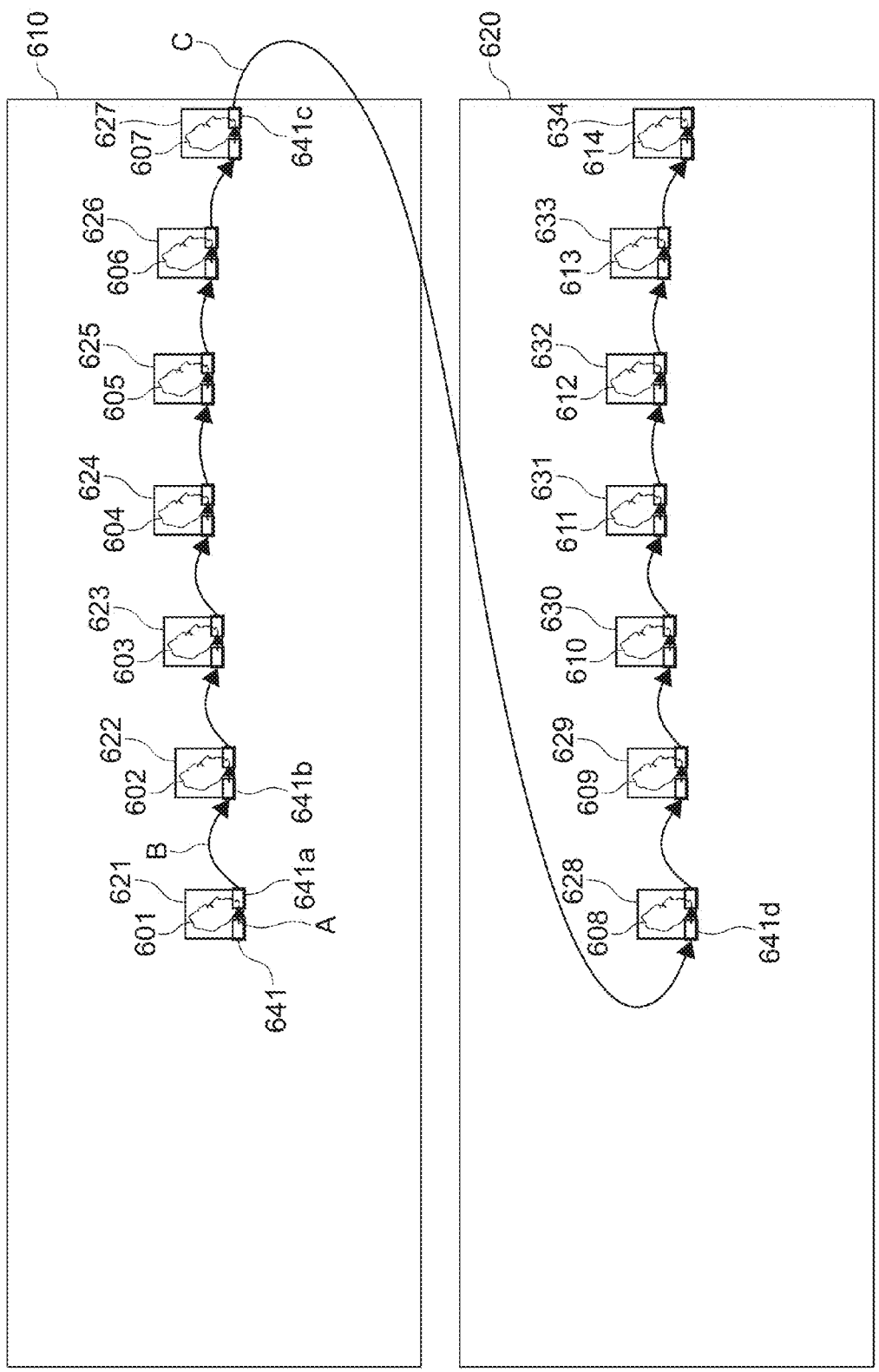

FIG. 13 A view for explaining discrete display.

Figure 14:
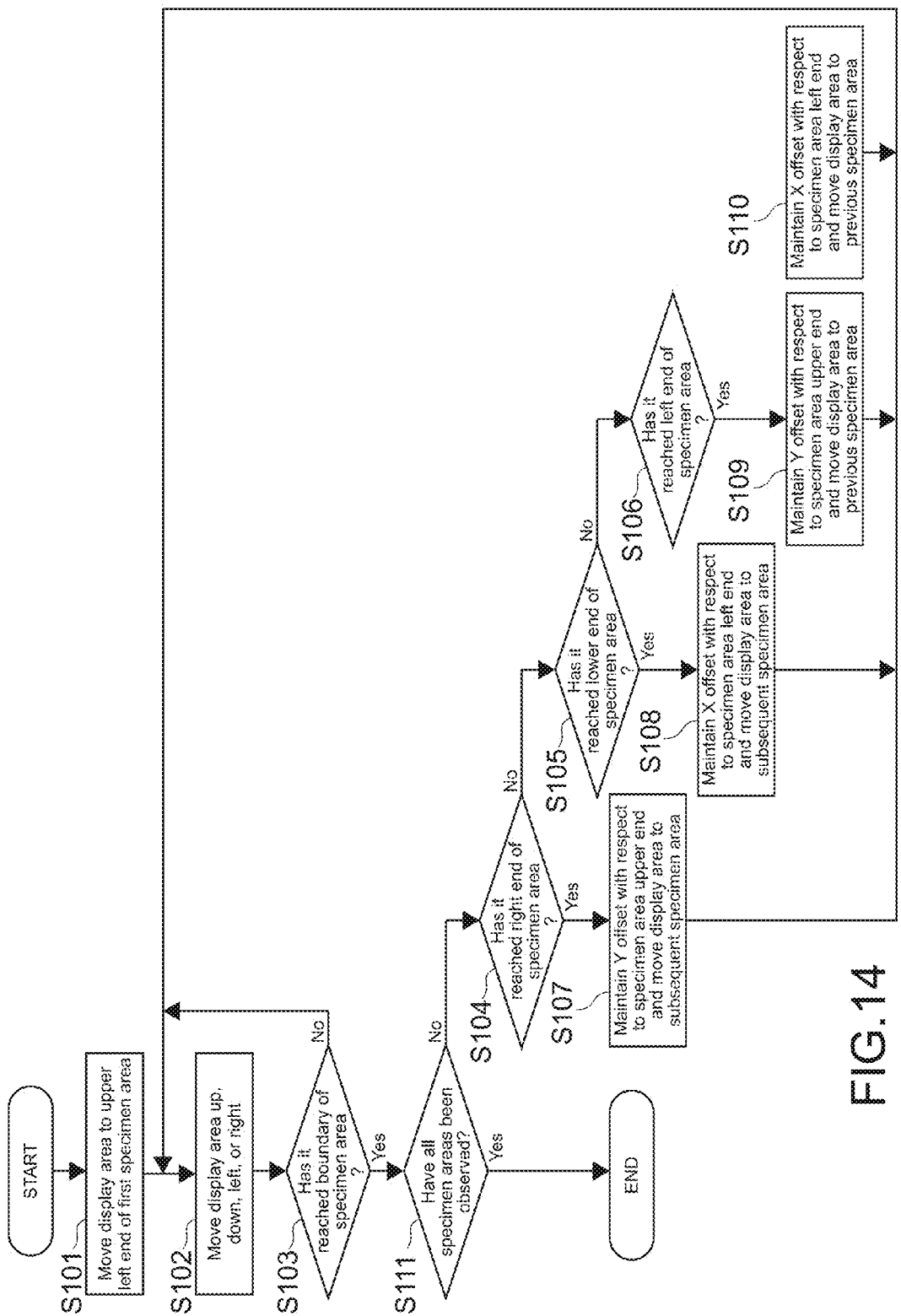

FIG. 14 A flowchart showing discrete display processing by a viewer.

Figure 15:
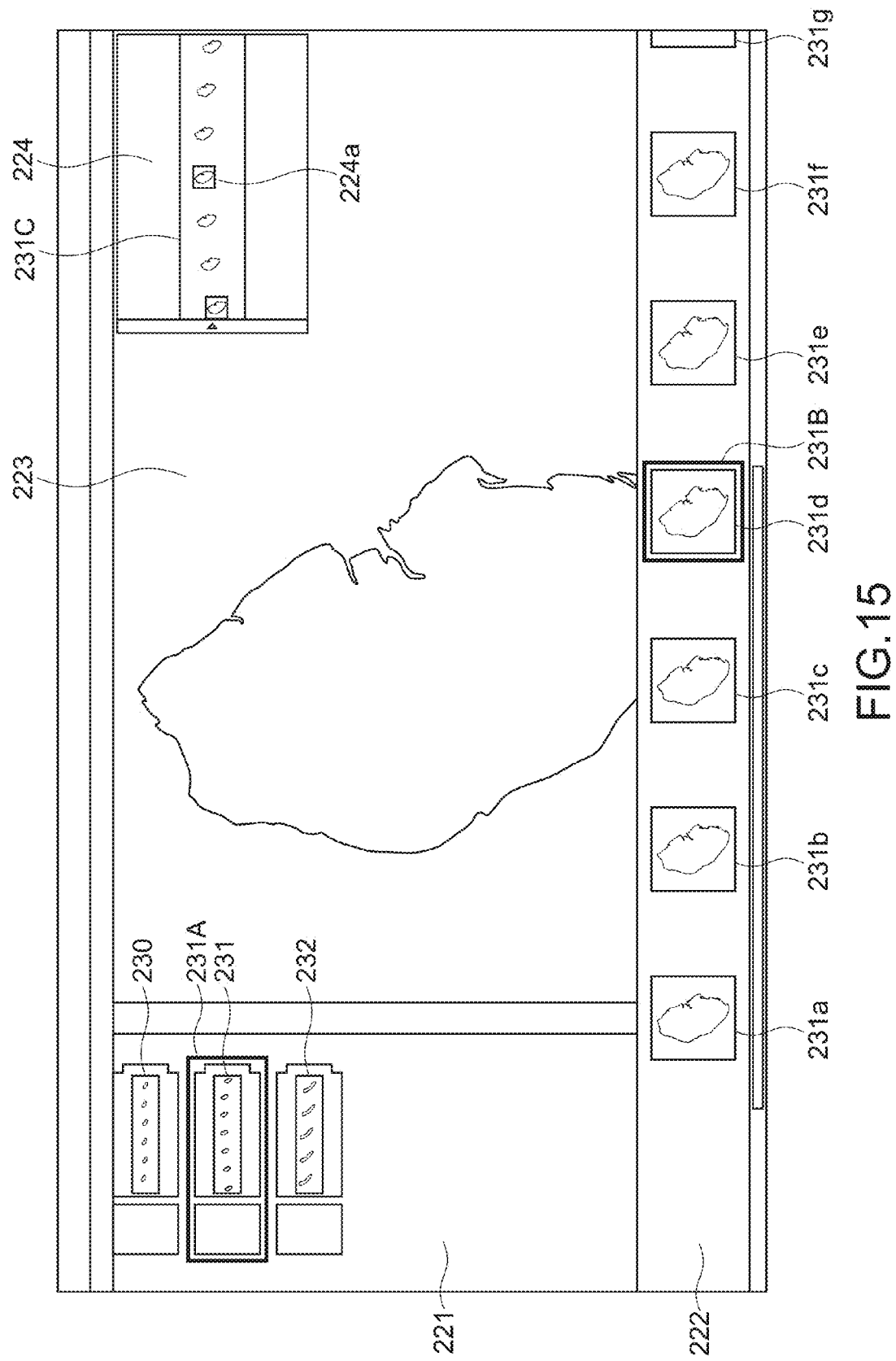

FIG. 15 A view showing a specimen area selection screen.

Figure 16:
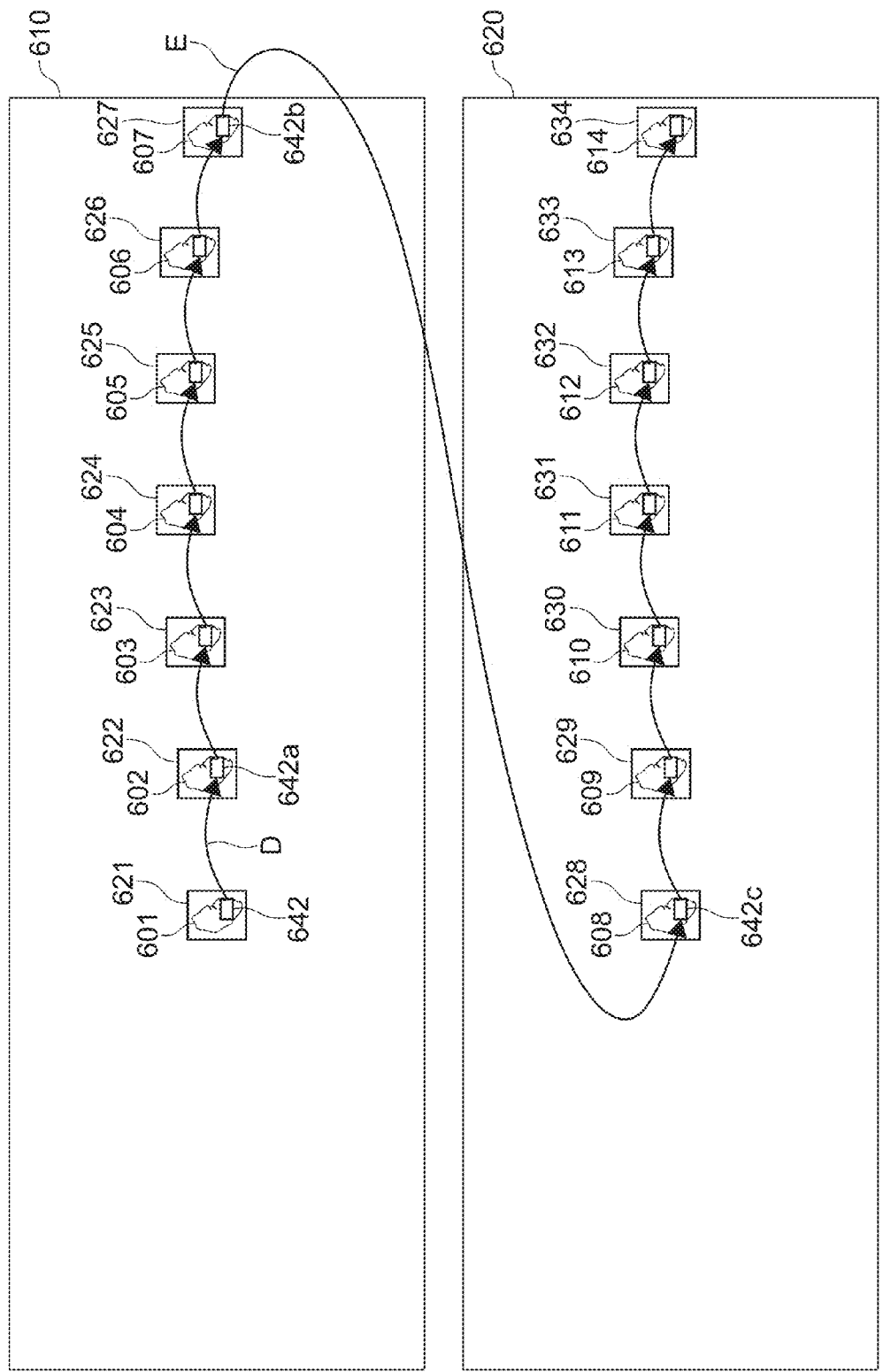

FIG. 16 A view for explaining jump display.

Figure 17:
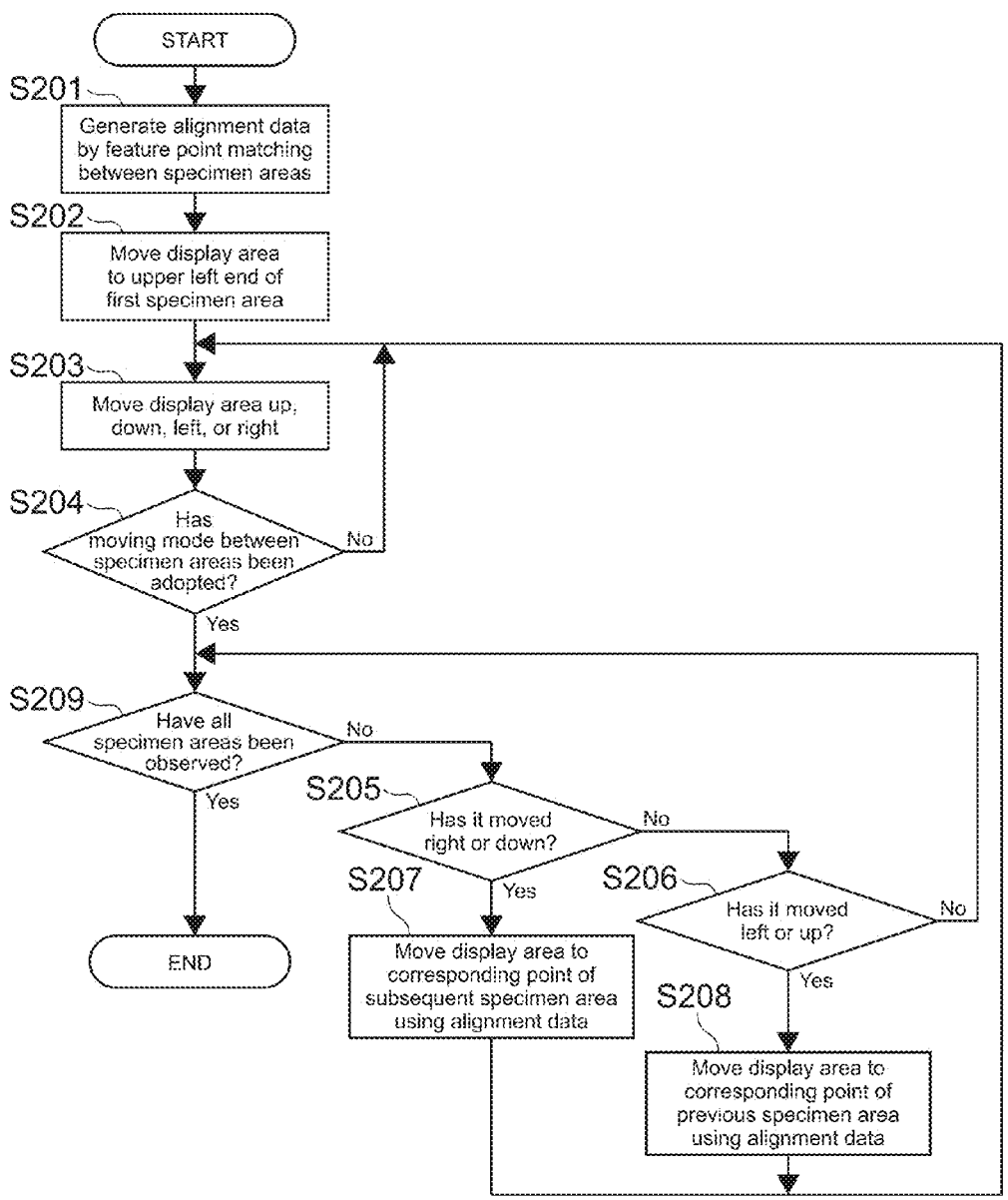

FIG. 17 A flowchart showing jump display processing by the viewer.

Figure 18:
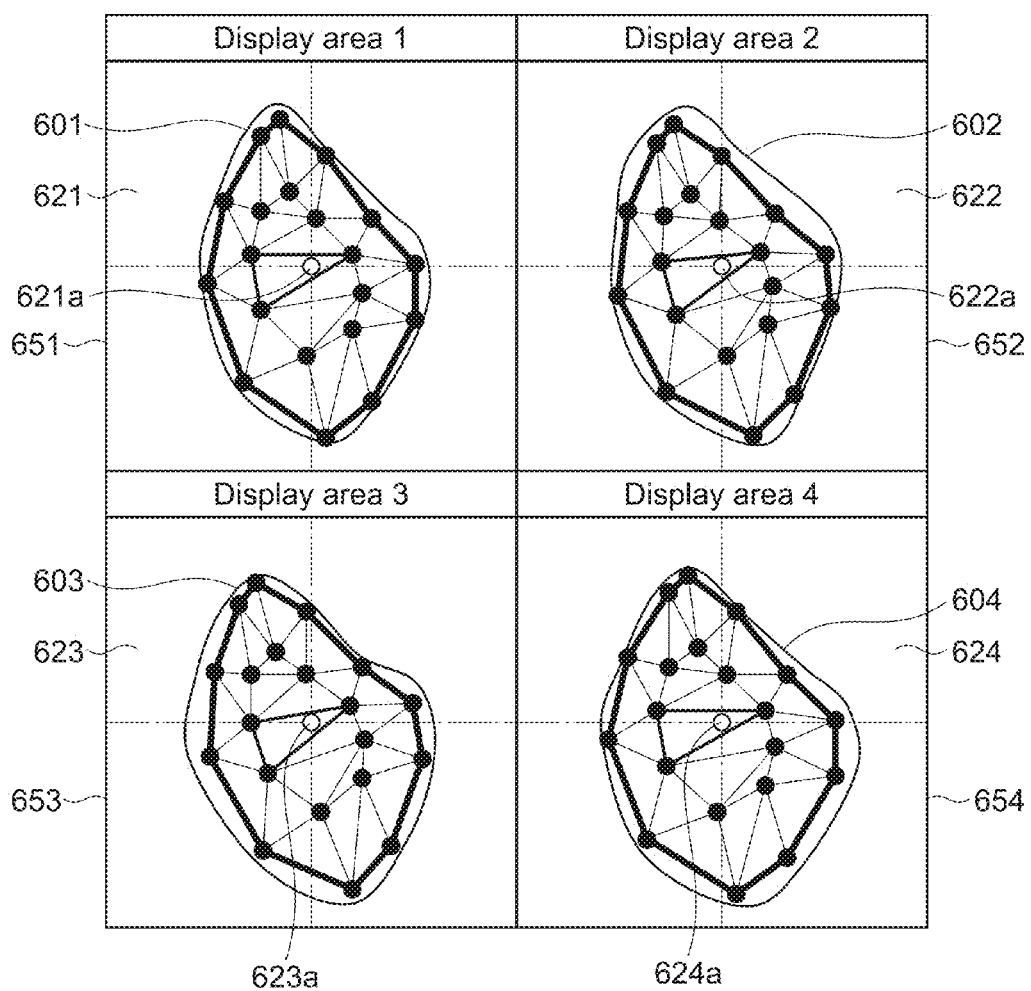

FIG. 18 A view for explaining synchronous display.

Figure 19:
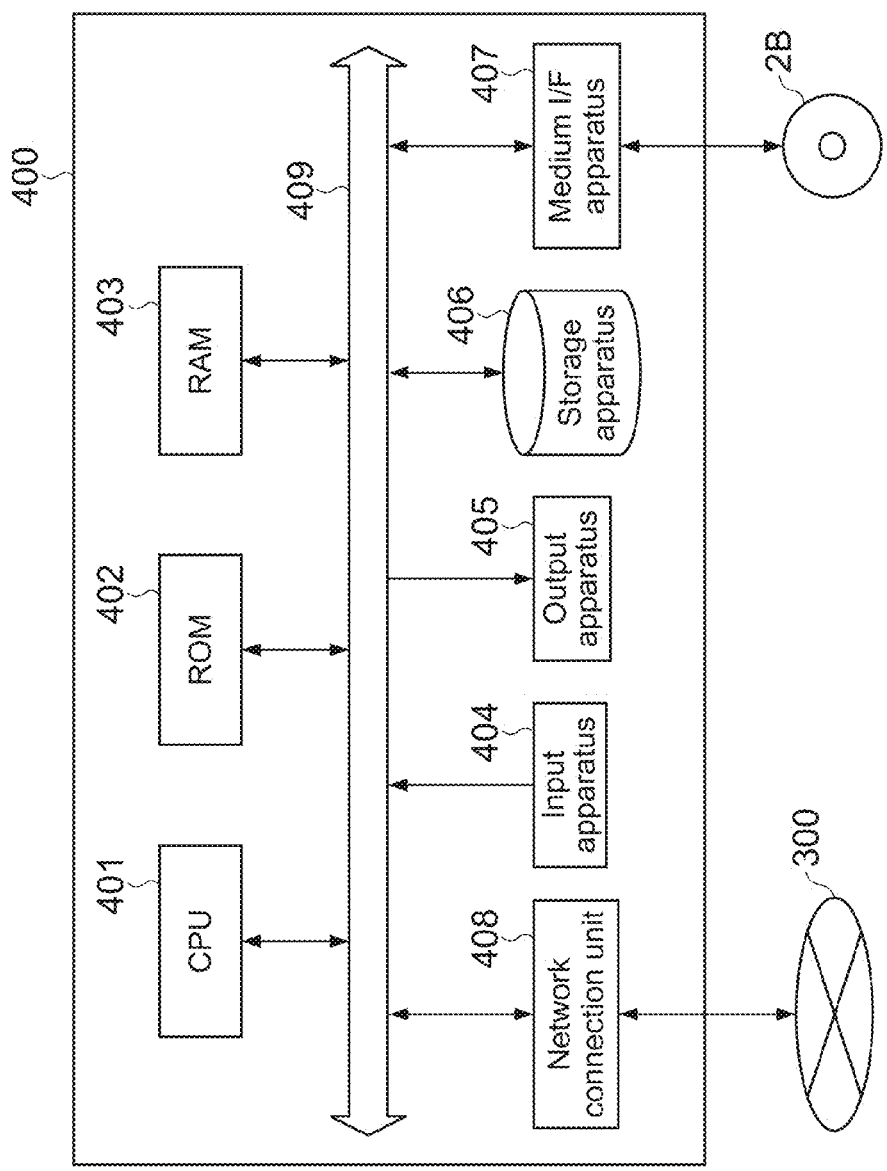

FIG. 19 A view showing a hardware configuration of a typical computer.

Figure 20:
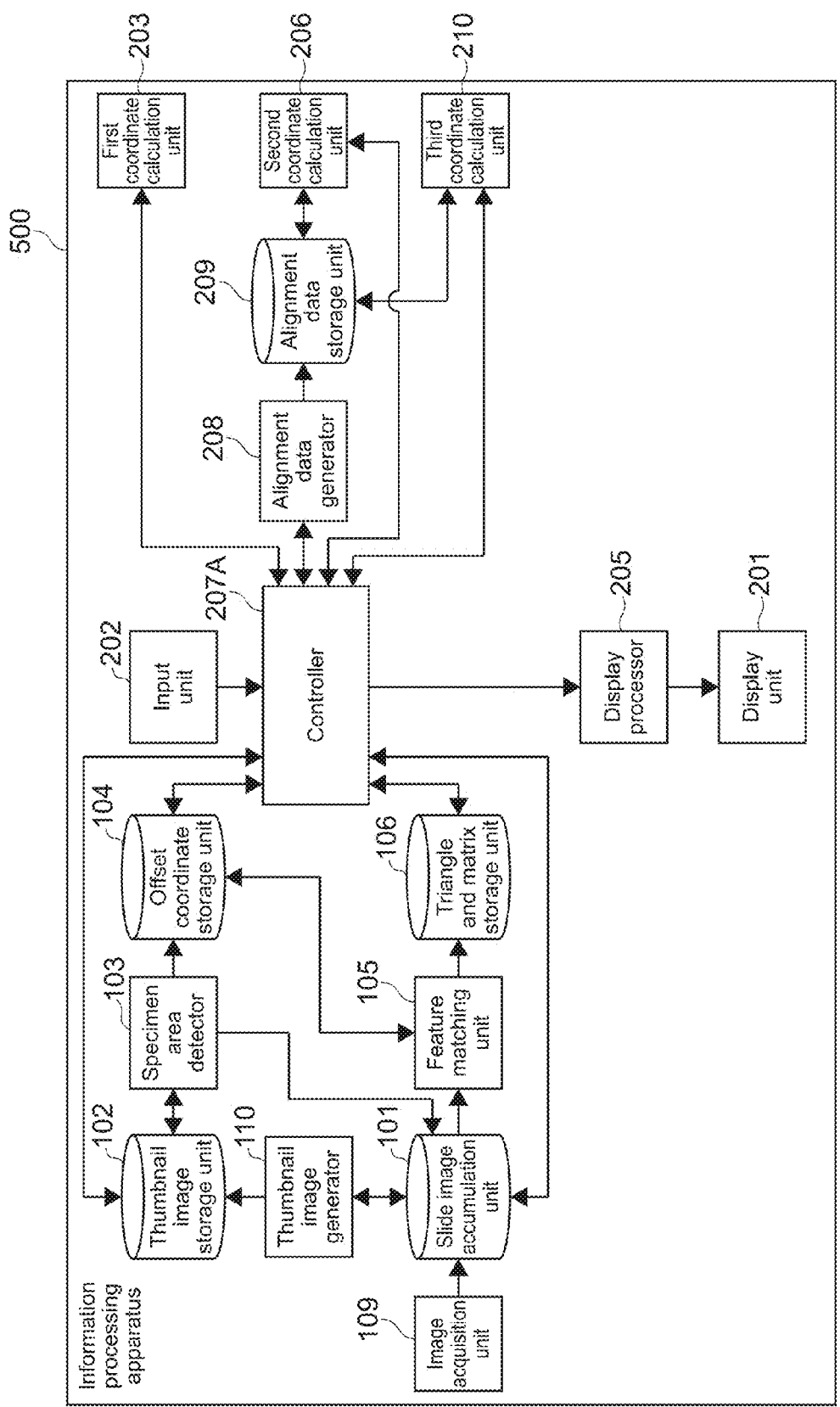

FIG. 20 A view showing a configuration of an information processing apparatus according to a modified example.

DETAILED DESCRIPTION

Hereinafter, embodiments according to the present technology will be described with reference to the drawings.

[Information Processing System]

FIG. 1 is a view showing a configuration of an information processing system according to an embodiment of the present technology.

This information processing system 1 includes an image server 100 and one or more viewers 200A and 200B. Those can be connected to one another over a network 300. The network 300 may be a WAN (Wide Area Network) such as the Internet or may be a LAN (Local Area Network). Further, the network 300 may be wired or wireless. Here, for easy description, a case where the two viewers 200A, 30B are connected is shown. However, the number of viewers may be three or more. Herein, when the viewers are not individually specified, those will be referred to as "viewers 200." The image server 100 and the one or more viewers 200 may be configured by, for example, a typical computer.

[Image Server 100]

Functional configurations of the image server 100 will be described.

FIG. 2 is a view showing the functional configurations of the image server 100 realized using a typical computer system.

The image server 100 includes an image acquisition unit 109 (acquisition unit), a slide image accumulation unit 101, a thumbnail image generator 110 (generator), a thumbnail image storage unit 102, a specimen area detector 103 (detector), an offset coordinate storage unit 104 (first storage unit), a feature matching unit 105, a triangle and matrix storage unit 106, a server controller 107, and a server communication unit 108. Each functional unit is realized in a computer resource based on programs loaded into a RAM (Random Access Memory).

For example, the image acquisition unit 109 acquires an image over a network or data of a slide image recorded in a removable recording medium. The image acquisition unit 109 accumulates this data of the slide image and a slide ID in the slide image accumulation unit 101 with this data of the slide image being associated with the slide ID. The term of "slide image" means, as shown in FIG. 3, an image obtained by capturing a glass slide 610 on which a plurality of sections 601 to 607 obtained by cutting a single specimen 600 in the same direction are placed, the plurality of sections 601 to 607 being arranged discretely and in one row. For example, in the case where a large number of sections are obtained from the single specimen 600, a plurality of glass slides on which a plurality of sections are placed are fabricated. The term of "slide ID" means an ID for individually identifying data of a plurality of slide images. Note that the phrase of "arranged in one row . . . " means an arrangement state in a direction from one end to the other end of a glass slide, not limited to the precisely linearly arrangement state.

The thumbnail image generator 110 generates thumbnail images of the slide images accumulated in the slide image accumulation unit 101. The thumbnail image generator 110 records data of the thumbnail images and the above-mentioned slide ID in the thumbnail image storage unit 102 with the data of the thumbnail images being associated with the above-mentioned slide ID. The term of "thumbnail image" means reduced data obtained by reducing a resolution of data of a slide image. The slide image accumulation unit 101 and the thumbnail image storage unit 102 are set in a rewritable non-volatile memory.

The specimen area detector 103 reads out the data of the thumbnail image from the thumbnail image storage unit 102. The specimen area detector 103 detects, from the read-out data of the thumbnail image, a plurality of areas including the plurality of sections placed on the glass slide (hereinafter, referred to as specimen areas). The detection of the specimen areas is performed as follows, for example. That is, the specimen area detector 103 recognizes a point in an image at which the luminance sharply changes, as a boundary of an object on the glass slide (edge extraction). The specimen area detector 103 recognizes a closed curve having a size larger than a threshold, as an edge (contour) of the section. Subsequently, the specimen area detector 103 extracts specimen areas including the recognized section from the data of the thumbnail image. For example, the specimen area detector 103 selects a range of the specimen area such that the section is positioned at almost the center of the specimen area and the section is within a range of the specimen area. The specimen areas have the same arbitrary shape and size. In this embodiment, each of the specimen areas is rectangular.

Further, the specimen area detector 103 calculates offset coordinates (position information) of each specimen area. The term of "offset coordinates" means information indicating a position of each of individual specimen areas in a coordinate space of the slide image including images of a plurality of sections. Specifically, the term of "offset coordinates" means a value expressing, by a difference (distance) from an origin in two axial directions, a position of an arbitrary point in each specimen area (e.g., one vertex of rectangular specimen area, for example, lower left end) while, for example, one vertex of the rectangular glass slide (e.g., lower left end) is the origin. The specimen area detector 103 associates metadata of the calculated offset coordinates, the specimen area number of the specimen area indicated by those offset coordinates, and the slide number of the slide image including that specimen area with one another, and records the metadata in the offset coordinate storage unit 104. This "number" reflects a section cutting order, that is, an arrangement order of the sections in a direction almost orthogonally to a cutting surface. For example, the "number" is expressed by an integer equal to or larger than one and set by the specimen area detector 103. The offset coordinate storage unit 104 is set in a rewritable non-volatile memory.

Now, a setting method for the slide number and the specimen area number will be described.

First, as described above, the specimen area detector 103 performs feature matching between images of a plurality of specimen areas detected from data of a thumbnail image. The feature matching only needs to be performed by the same manner as the feature matching by a feature matching unit 150 to be described later. Based on a result of the feature matching, the specimen area detector 103 determines degrees of similarity among sections A to F within the plurality of specimen areas included in one slide image. Then, as shown in FIG. 10, the specimen area detector 103 performs grouping such that the specimen areas including the sections B and C having high degree of similarity are located close to each other and the specimen areas including the sections D and E having high degree of similarity are located close to each other. Then, as shown in FIG. 11, the specimen area detector 103 determines that the sections are continuous from the large section A on one side of the specimen 600 (e.g., root) to the small section F (e.g., tip). As shown in FIG. 12, the specimen area detector 103 sets continuous specimen area numbers such that position intervals of feature points decrease.

When the specimen area number of the plurality of specimen areas included in all the slide images are set, the specimen area detector 103 determines degrees of similarity between specimen areas at both ends of a certain slide image and specimen areas at both ends of a different slide image. The specimen area detector 103 determines the slide images including the specimen areas having a high degree of similarity as continuous slide images, and sets continuous slide numbers. The specimen area detector 103 rewrites the slide IDs recorded in the slide image accumulation unit 101 and the thumbnail image storage unit 102, using the set slide numbers.

Note that the specimen area number and the slide number may be modified by the user through the viewer 200. Alternatively, for example, when the user arranges the sections in order from the left to the right on the glass slide or when the user wishes to place a specimen area suspected of having a disease at the head, the specimen area number and the slide number may be set by the user through the viewer 200. Alternatively, information inputted into an LIS (Laboratory Information System) may be loaded into the viewer 200 to set the specimen area number and the slide number.

The feature matching unit 105 performs the feature matching between images of the specimen areas of each of the slide images accumulated in the slide image accumulation unit 101 (to be described later in detail). Specifically, the feature matching unit 105 reads out data of the slide image from the slide image accumulation unit 101. Further, the feature matching unit 105 reads out, from the offset coordinate storage unit 104, the plurality of specimen area numbers and offset coordinates associated with the slide number associated with data of the read-out slide image. The feature matching unit 105 detects the plurality of specimen areas from the slide image, based on the read-out offset coordinates and a size common to each specimen area. The feature matching unit 105 performs the feature matching between images of the plurality of detected specimen areas, and calculates a triangle and an affine transformation matrix. The feature matching unit 105 records, in the triangle and matrix storage unit 106, metadata of data of the calculated triangle and affine transformation matrix, the specimen area number that identifies each specimen area, and the slide number with the metadata being associated with each other. The triangle and matrix storage unit 106 is set in a rewritable non-volatile memory.

In response to a request from the viewer 200, the server controller 107 reads out corresponding image data from the slide image accumulation unit 101, and provides the image data to the viewer 200 through the server communication unit 108.

[Feature Matching]

Now, a specific method for the feature matching between the images of the specimen areas by the feature matching unit 105 will be described.

First, the feature matching unit 105 extracts a point in which a change of a luminescence value is above a threshold (referred to as feature point; black point in the figure) from an image of an arbitrary detection area (referred to as detection area A) being a reference as shown in FIG. 4 using, for example, an extraction algorithm such as Harris algorithm. The Harris algorithm has an advantage in that it is robust against rotation of an image and feature points are not taken on gradation.

Subsequently, the feature matching unit 105 determines which position in an image of a different detection area (hereinafter, referred to as detection area B) each of the feature points in the image of the detection area A corresponds to, using a normalized correlation between the images. Specifically, as shown in FIG. 5, in the image of the detection area B, the feature matching unit 105 sets a search area SA with a feature point AP (see FIG. 4) in the image of the detection area A to be a reference being a reference. The feature matching unit 105 searches the search area SA of the detection area B and calculates a normalized correlation between a texture pattern of the detection area B and a texture pattern of the detection area A. The feature matching unit 105 determines a point having a highest value obtained (hereinafter, referred to as highest point) as a corresponding point BP (white point in the figure) to a feature point AP (black point in the figure). In the example shown in the figure, the feature matching unit 105 determines a point having a highest value of 0.98 among values of 0.04, 0.87, and 0.98 that are obtained by calculating the normalized correlation, as the corresponding point BP. Note that, if the highest point is lower than a predetermined threshold (e.g., 0.90), the feature matching unit 105 determines that the feature point AP cannot be employed for matching. Further, if the number of feature points determined to be employed does not reach a predetermined threshold, the feature matching unit 105 determines that matching between the detection areas A and B is impossible because similarity between the detection areas A and B is low.

When normalized correlations between all the feature points are calculated in the above-mentioned manner, as shown in FIG. 6, using division algorithm such as Delaunay algorithm, the feature matching unit 105 divides the image of the detection area A into a plurality of triangles having the employed feature points (black points in the figure) as vertices. As shown in FIG. 7, while maintaining the division topology of the detection area A, the feature matching unit 105 also divides the image of the detection area B into a plurality of triangles having the corresponding points (white points in the figure) corresponding to the employed feature points (black points in the figure) as vertices.

Subsequently, the feature matching unit 105 identifies a triangle AT including display center coordinates AC of the image of the detection area A by determining whether it is an interior point or an exterior point. The feature matching unit 105 calculates an affine transformation matrix for converting a triangle BT of the detection area B corresponding to the triangle AT of the detection area A into the triangle AT. The calculated affine transformation matrix can be used for calculating, based on coordinates (e.g., center coordinates) of an arbitrary point of a certain detection area, coordinates of a point corresponding to a different detection area (in this case, center coordinates). More specifically, as shown in FIG. 8, the affine transformation matrix can be used for processing of, for example, identifying a position BC of the display center coordinates AC (see FIG. 8) of the image of the specimen area A (see FIG. 6) in the image of the specimen area B and moving the display center of a screen of the specimen area B to the position BC.

[Viewer 200]

Functional configurations of the viewer 200 will be described.

FIG. 9 is a view showing the functional configurations of the viewer 200 realized using a typical computer system.

The viewer 200 includes a viewer controller 207 (controller), a viewer communication unit 204, an alignment data generation unit 208 (alignment unit), an alignment data storage unit 209 (second storage unit), a first coordinate calculation unit 203 (controller), a second coordinate calculation unit 206 (controller), a third coordinate calculation unit 210 (controller), a display processor 205, a display unit 201, and an input unit 202. Each functional unit is realized in a computer resource based on programs loaded into the RAM.

The viewer controller 207 performs processing of transmitting a request to the image server 100 through the viewer communication unit 204, providing received data to each functional unit of the viewer 200, and controlling each functional unit.

Based on the data of the triangle and affine transformation matrix obtained by the feature matching, the alignment data generation unit 208 calculates an offset amount in the two axial directions between the plurality of specimen areas in the coordinate space of the slide image. More specifically, the alignment data generation unit 208 calculates, as alignment data, an offset amount of coordinates in the two axial directions in the coordinate space of the specimen area between a triangle including a point located at center coordinates of a certain specimen area as a reference point and a triangle including a point corresponding to the reference point in a different specimen area, for example. The alignment data generation unit 208 records the calculated alignment data in the alignment data storage unit 209. The alignment data storage unit 209 is set in a rewritable non-volatile memory.

The first coordinate calculation unit 203 performs processing of, for example, calculating the position information of the display area for performing an operation (discrete display) for jumping areas other than the specimen areas and displaying only the specimen areas in order.

The second coordinate calculation unit 206 performs processing of, for example, calculating the position information of the display area for performing an operation (jump display) for displaying corresponding areas of the specimen areas in order. The term of "corresponding areas" means areas in the plurality of sections that correspond to each other in the direction almost orthogonal to the cutting surface.

The third coordinate calculation unit 210 performs processing of, for example, calculating the position information of the display area for performing an operation (synchronous display) for dividing the display screen and displaying the plurality of specimen areas in synchronization.

The display processor 205 outputs display data for displaying the image data to the display unit 201.

[Operations of Viewer 200]

Next, operations of the viewer 200 will be described. Descriptions of the operations will be made in the following order.

1. Operation (discrete display) for jumping the areas other than the specimen areas and displaying only the specimen areas in order
2. Operation (jump display) for displaying corresponding areas of the specimen areas in order
3. Operation (synchronous display) for dividing the display screen and displaying the plurality of specimen areas in synchronization

[1. Discrete Display]

In the discrete display, processing for jumping the areas other than the specimen areas in the slide image (area in which no sections are placed) and displaying only the specimen areas in order is performed.

FIG. 13 is a view showing a specific example of the discrete display. The figure shows a first glass slide 610 and a second glass slide 620. All sections obtained from a single specimen cannot be placed on a single glass slide, those sections are placed on a plurality of glass slides. The figure shows an example in which, out of the plurality of sections cut in the order of the first to fourteenth sections 601 to 614, the first to seventh sections 601 to 607 are placed on the first glass slide 610 in this order and the eighth to fourteen sections 608 to 614 are placed on the second glass slide 620 in this order. Further, first to fourteenth specimen areas 621 to 634 including the first to fourteenth sections 601 to 614 are detected. First, a rectangular area at a lower left corner of the first specimen area 621 is displayed on the display unit 201 as a display area 641. The user uses the input unit 202 such as a mouse to input an order for moving an image of the display area 641 up, down, left, and right. When an instruction of moving the display area 641 in a right-hand direction is inputted, the display area horizontally moves within the first specimen area 621 up to a display area 641a at a lower right corner of the first specimen area 621 (arrow A). In addition, when an instruction of moving in the right-hand direction is inputted, jumping the area in which no sections are placed between the first and second specimen areas 621 and 622, the display area moves a display area 641b at a lower left corner of the second specimen area 622 (arrow B). It is assumed that such movements between the specimen areas are repeated, the display area moves to a display area 641c at a lower right corner of a seventh specimen area 621, and further an instruction of moving in the right-hand direction is inputted. In this case, no specimen areas are present on the right-hand side of a seventh specimen area 627 on the first glass slide 610. Therefore, the display area moves to a display area 641d at a lower left corner of an eighth specimen area 628 on the second glass slide 620 (arrow C).

Next, the discrete display processing will be described in more detail.

FIG. 14 is a flowchart showing the discrete display processing by the viewer 200.

Using, for example, the input unit 202, the user selects the discrete display as a display mode. When the viewer controller 207 receives a selection instruction, the viewer controller 207 uses the viewer communication unit 204 to read out the thumbnail image of the slide image associated with the slide number and recorded in the thumbnail image storage unit 102 of the image server 100. The viewer controller 207 causes the display processor 205 to generate a specimen area selection screen based on the read-out slide number and thumbnail image of the slide image. The viewer controller 207 causes the display unit 201 to display the specimen area selection screen.

FIG. 15 is a view showing the specimen area selection screen.

As shown in the figure, a specimen area selection screen 220 includes a slide tray 221, a specimen area tray 222, an observation display section 223, and a display-area display section 224. In the slide tray 221, thumbnail images 230, 231, and 232 of a slide image read out by the viewer controller 207 from the image server 100 are displayed as a list. The thumbnail images 230, 231, and 232 of the slide image are arranged in a slide number order from the upper side to the lower side. Using the input unit 202 such as a mouse, the user selects the one thumbnail image 231 from the plurality of thumbnail images 230, 231, and 232 displayed in the slide tray 221. The viewer controller 207 causes the display processor 205 to display the selected thumbnail image 231 in an identifiable form with a frame line (231A) or the like and to display a thumbnail image 231C corresponding to the selected thumbnail image 231 in the display-area display section 224.

The viewer controller 207 use the viewer communication unit 204 to read out the specimen area number and the offset coordinates being the metadata associated with the slide number associated with the selected thumbnail image and recorded in the offset coordinate storage unit 104 of the image server 100. Further, the viewer controller 207 uses the viewer communication unit 204 to read out the specimen area number and the triangle and affine transformation matrix being the metadata associated with the slide number and recorded in the triangle and matrix storage unit 106 of the image server 100. Based on the read-out offset coordinates and slide number being the metadata, the viewer controller 207 causes the display processor 205 to display thumbnail images 231a to 231g of the plurality of specimen areas within the selected thumbnail image 231, in the specimen area tray 222 as a list. The thumbnail images 231a to 231g of the specimen areas are arranged in a specimen area number order from the left to the right.

Using the input unit 202 such as a mouse, the user selects one thumbnail image 231d among the plurality of thumbnail images 231a to 231g displayed in the specimen area tray 222. The selected thumbnail image 231d is displayed to be identifiable with a frame line (231B) or the like. Further, the image of the specimen area of the selected thumbnail image 231d is displayed in the observation display section 223. In the observation display section 223, in addition to the image of the entire specimen area is displayed in this manner, part of the specimen area (display area) is displayed at an arbitrary resolution. Further, in the thumbnail image 231C displayed in the display-area display section 224, a position of the specimen area currently displayed in the observation display section 223 is displayed to be identifiable with a frame line (224a) or the like. Note that the selection operations for a slide being a display target and the specimen area are common in the discrete display, the jump display, and the synchronous display.

The viewer controller 207 detects an input by the user into the input unit 202 and determines the slide number and the specimen area number of the slide and the specimen area to be first displayed. Then, the viewer controller 207 provides the offset coordinates associated with the slide number and the specimen area number being the metadata to the first coordinate calculation unit 203 that performs processing for the discrete display. The first coordinate calculation unit 203 calculates the position information of the display area to be first displayed, based on the offset coordinates of the specimen area that is the metadata and on a size and an initial position (e.g., lower left corner of specimen area) that are common to the display areas. The size and the initial position common to the display areas are recorded in a rewritable non-volatile memory. The first coordinate calculation unit 203 provides the calculated position information to the viewer controller 207. The viewer controller 207 transmits a request for acquiring an image corresponding to the display area to the image server 100 through the viewer communication unit 204.

The server controller 107 of the image server 100 receives this request through the server communication unit 108, and reads out the image data of the display area included in the request from the slide image accumulation unit 101. The server controller 107 transmits the read-out image data to the viewer 200 through the server communication unit 108.

The viewer controller 207 of the viewer 200 receives the image data of the display area through the viewer communication unit 204. The viewer controller 207 of the viewer 200 provides the received image data of the display area to the display processor 205. The display processor 205 outputs display data for displaying the image data to the display unit 201. The display processor 205 causes the display unit 201 to display the image data in the observation display section 223 of the specimen area selection screen 220 (Step S101).

Using, for example, the input unit 202 such as a mouse, the user inputs an order for moving the image of the display area displayed in the observation display section 223 up, down, left, and right. The viewer controller 207 detects an input of a moving order into the input unit 202 by the user. The viewer controller 207 provides the detected moving order to the first coordinate calculation unit 203. Based on the moving order, the first coordinate calculation unit 203 calculates the position information of the display area at a moving destination. The first coordinate calculation unit 203 provides the calculated position information to the viewer controller 207. The viewer controller 207 transmits a request for acquiring an image corresponding to the display area to the image server 100 through the viewer communication unit 204.

After that, as in Step S101, in response to the request from the viewer 200, the server controller 107 of the image server 100 reads out the image data corresponding to the slide image accumulation unit 101, and transmits the image data to the viewer 200 through the server communication unit 108. With this, the viewer 200 acquires the image data of the display area at the moving destination, and updates the display contents of the display unit 201 (Step S102).

If the first coordinate calculation unit 203 determines, based on the calculated position information, that the display area at the moving destination has reached the boundary of the specimen area (Yes in Step 103), the first coordinate calculation unit 203 determines which end (right end, lower end, left end, and upper end) of the specimen area that boundary is located at (Steps S104, S105, and S106). If the display area is located at the right end of the specimen area, the first coordinate calculation unit 203 increments the specimen area number of the specimen area being a display target when an instruction of moving in the right-hand direction from the user is detected (Yes in Step 104). With this, the obtained specimen area number becomes a specimen area number of a specimen area to be next displayed. The first coordinate calculation unit 203 sets the display area within the specimen area corresponding to the specimen area number obtained by the increment in the following manner. That is, the first coordinate calculation unit 203 maintains a Y-offset between the upper end of the specimen area and the upper end of the display area, and sets the display area within the specimen area at the moving destination such that the left end of the specimen area and the left end of the display area correspond to each other (Step S107).

On the other hand, if the display area is located at the lower end of the specimen area, when the first coordinate calculation unit 203 detects an instruction of moving in a lower direction from the user (Yes in Step 105), the first coordinate calculation unit 203 increments the specimen area number of the specimen area being the display target. The first coordinate calculation unit 203 sets the display area within the specimen area corresponding to the specimen area number obtained by the increment in the following manner. That is, the first coordinate calculation unit 203 maintains an X-offset between the left end of the specimen area and the left end of the display area, and sets the display area within the specimen area at the moving destination such that the upper end of the specimen area and the upper end of the display area correspond to each other (Step S108).

On the other hand, if the display area is located at the left end of the specimen area, when the first coordinate calculation unit 203 detects an instruction of moving in the left-hand direction from the user (Yes in Step 106), the first coordinate calculation unit 203 decrements the specimen area number of the specimen area being the display target. The first coordinate calculation unit 203 sets the display area within the specimen area corresponding to the specimen area number obtained by the decrement in the following manner. That is, the first coordinate calculation unit 203 maintains the Y-offset between the upper end of the specimen area and the upper end of the display area, and sets the display area within the specimen area at the moving destination such that the right end of the specimen area and the right end of the display area correspond to each other (Step S109).

On the other hand, if the display area is located at the upper end of the specimen area, when the first coordinate calculation unit 203 detects an instruction of moving in an upper direction from the user (No in Step 106), the first coordinate calculation unit 203 decrements the specimen area number of the specimen area being the display target. The first coordinate calculation unit 203 sets the display area within the specimen area corresponding to the specimen area number obtained by the decrement in the following manner. That is, the first coordinate calculation unit 203 maintains the X-offset between the left end of the specimen area and the left end of the display area, and sets the display area within the specimen area at the moving destination such that the lower end of the specimen area and the lower end of the display area correspond to each other (Step S110).

When the display area within the specimen area at the moving destination is set based on the moving order by the user that is provided from the viewer controller 207 as described above (Steps S107 to S110), the first coordinate calculation unit 203 provides position information of the set display area to the viewer controller 207. Then, the viewer controller 207 transmits a request for acquiring an image corresponding to the display area to the image server 100 through the viewer communication unit 204.

After that, as in Step S101, the server controller 107 of the image server 100 reads out the corresponding image data from the slide image accumulation unit 101 in response to the request from the viewer 200, and transmits the corresponding image data to the viewer 200 through the server communication unit 108. With this, the viewer 200 acquires the image data of the display area at the moving destination, and updates the display contents of the display unit 201.

Note that, if the specimen area number obtained by the increment in Steps S107 and S108 is not recorded in the offset coordinate storage unit 104, the first coordinate calculation unit 203 increments the slide number of the currently displayed slide. Then, the first coordinate calculation unit 203 sets an inside of the specimen area corresponding to the specimen area number=1 associated with the slide number obtained by the increment, as an observation target. Further, if the specimen area number obtained by the decrement in Steps S109 and S110 is not recorded in the offset coordinate storage unit 104 (the specimen area number=0), the first coordinate calculation unit 203 decrements the slide number of the currently displayed slide. Then, the first coordinate calculation unit 203 sets the specimen area corresponding to the maximum specimen area number associated with the slide number obtained by the decrement, as the observation target.

If, as a result of the above-mentioned calculations, the first coordinate calculation unit 203 determines that a specimen area to be next displayed is not present (Yes in Step 111), the first coordinate calculation unit 203 terminates the discrete display processing.

As mentioned above, the information processing system 1 according to this embodiment includes the image acquisition unit 109 that acquires image data obtained by capturing a slide on which a plurality of sections obtained by cutting a single specimen in the same direction are discretely placed, the specimen area detector 103 that detects the plurality of specimen areas in the acquired image data, and calculates position information relatively indicating positions of the individual specimen areas in a coordinate space of the image data, the plurality of specimen areas having the same shape and including the individual sections, the offset coordinate storage unit 104 that stores the calculated position information, and the viewer controller 207 that switches display between the specimen areas based on the stored position information.

That is, the viewer controller 207 switches display between the specimen areas based on the position information being the metadata. With this, the viewer controller 207 can jump the areas other than the specimen areas and switch display between the specimen areas irrespective of the fact that the image data acquired by the acquisition unit is the image data obtained by capturing the slide itself on which the plurality of sections are placed. Further, by recording the specimen area as the position information being the metadata, the first storage unit can switch display between the specimen areas efficiently and at high speed. In addition, using the position information being the metadata, even if the plurality of specimen areas are arranged in image data of a plurality of slides, the display processing can be efficiently performed as in the case where a plurality of specimen areas detected from single image data are displayed in order.

The information processing system 1 according to this embodiment further includes the thumbnail image thumbnail image generator 110 110 that generates reduced data by reducing a resolution of the image data. The specimen area detector 103 detects the plurality of specimen areas in the image data by detecting the plurality of specimen areas from the reduced data.

That is, by detecting the specimen areas from the reduced data obtained by the thumbnail image generator 110 reducing the resolution, it is possible to detect the specimen areas efficiently and at high speed.

In the information processing system 1 according to this embodiment, a plurality of image data items of the plurality of specimen areas are managed in the cutting order. When the viewer controller 207 receives, from the user, specification of a specimen area to be displayed in the acquired image data and a range therein, the viewer controller 207 calculates the range in the specified specimen area as the display area. If the display area is located at an end of the specimen area, when the viewer controller 207 receives, from the user, an instruction of moving the display area outside the end, the viewer controller 207 switches to display a neighbor specimen area in the cutting order based on the stored position information.

That is, even when the display area of part of the specimen area is displayed, it is possible to jump the areas other than the specimen areas and perform switching of the display between the specimen areas.

In the information processing system 1 according to this embodiment, if the calculated display area is located at an end of the specimen area in one axial direction of the plurality of specimen areas in the coordinate space of the image data, when the viewer controller 207 receives, from the user, an instruction of moving the display area outside the end in the one axial direction, the viewer controller 207 performs switching to the display of a neighbor specimen area in the cutting order while fixing a position in the other axial direction.

With this, a position of the display area in the specimen area at the moving destination corresponds to a position of the display area in the specimen area at a moving source at the moving destination. Therefore, a convenience for the user can be provided.

In the information processing system 1 according to this embodiment, the image acquisition unit 109 acquires image data obtained by capturing a slide on which a plurality of sections obtained by cutting a single specimen in the same direction are placed discretely and in one row. The viewer controller 207 calculates, when the calculated display area is located at an end of the specimen area in an arrangement direction of the plurality of specimen areas in a coordinate space of the image data and the viewer controller 207 receives, from the user, an instruction of moving the display area in the arrangement direction beyond the end, the display area of the specimen area at the moving destination based on the stored position information.

With this, even when the plurality of specimen areas arranged in the one row are displayed, display can be switched between the specimen areas, jumping the areas other than the specimen areas.

In the information processing method according to this embodiment, the image acquisition unit 109 acquires image data obtained by capturing a slide on which the plurality of sections obtained by cutting a single specimen in the same direction are discretely placed. The specimen area detector 103 detects the plurality of specimen areas in the acquired image data, and calculates position information relatively indicating positions of the individual specimen areas in a coordinate space of the image data, the plurality of specimen areas having the same shape and including the individual sections. The offset coordinate storage unit 104 stores the calculated position information. The viewer controller 207 switches display between the specimen areas based on the stored position information.

[2. Jump Display]

Next, the jump display will be described. In the jump display, processing for displaying corresponding areas of the specimen area in order is performed.

FIG. 16 is a view showing a specific example of the jump display. The figure shows an example in which, as in FIG. 13, the first to fourteenth sections 601 to 614 are placed on the first and second glass slides 610 and 620 in this order and the first to fourteenth specimen areas 621 to 634 respectively including the first to fourteenth sections 601 to 614 are detected. In a state in which a display area 642 at an arbitrary position in the first specimen area 621 is displayed, the thumbnail image of the specimen area 622 on the right next to the thumbnail image of the currently displayed first specimen area 621 is selected from the specimen area tray 222 (FIG. 15) of the specimen area selection screen 220, as the specimen area at the moving destination. In this manner, when an order for moving display to the image of the different specimen area is inputted, the display area moves to a display area 642a of the second specimen area 622 (arrow D). Here, the display areas 642 and 642a are located at the same position in the coordinate space of the specimen areas 621 and 622 having the same shape. That is, sites continuous in the direction almost orthogonal to the cutting surface of the specimen are displayed as the display areas 642 and 642a. It is assumed that movements between the specimen areas are repeated and the display area moves to the display area 642b of the seventh specimen area 621 (located at the same position as the display areas 642 and 642a in the coordinate space of the specimen areas having the same shape). In addition, it is assumed that an instruction for moving to the second glass slide 620 is inputted by operating the thumbnail image of the second glass slide 620 located below the thumbnail image of the first glass slide 610 in the specimen area tray 222 (FIG. 15). In this case, the display area (located at the same position as the display area 642b in the coordinate space of the specimen areas having the same shape) moves to the display area 642c of the eighth specimen area 628 of the second glass slide 620 (arrow E).

Next, the jump display processing will be described in more detail.

FIG. 17 is a flowchart showing the jump display processing by the viewer 200.

As in selection of the slide and the specimen area to be first displayed in the above-mentioned discrete display, a slide and a specimen area to be first displayed are selected. Further, the user selects the jump display as the display mode, for example, using the input unit 202.

When the selection of the jump display is determined, the viewer controller 207 provides the slide number, the specimen area number, the data of the triangle and affine transformation matrix being the metadata to the alignment data generation unit 208. When the alignment data generation unit 208 acquires the metadata, the alignment data generation unit 208 calculates offsets in the two axial directions between the specimen areas in the coordinate space of the slide image in all combinations of the plurality of specimen areas. More specifically, using the affine transformation matrix, the alignment data generation unit 208 calculates an offset in the two axial directions in absolute coordinates between a triangle including a point located at center coordinates of a certain specimen area, for example, as a reference point and a triangle including a point corresponding to this reference point in a different specimen area. This offset becomes alignment data for adjusting the display area in the one specimen area with respect to the display area in the other specimen area. The alignment data generation unit 208 records the calculated alignment data in the alignment data storage unit 209 (Step S201). Note that the generation operations for the alignment data are common on the display modes of the jump display and the synchronous display.

The viewer controller 207 provides the offset coordinates associated with the slide number and the specimen area number of the slide and the specimen area being the above-mentioned display targets selected by the user, to the second coordinate calculation unit 206 that performs processing for the jump display. The second coordinate calculation unit 206 calculates, based on the offset coordinates and on the size and the initial position (e.g., lower left corner of specimen area) common to the display areas, position information of the display area to be first displayed. Those size and initial position common to the display areas are recorded in a rewritable non-volatile memory. The second coordinate calculation unit 206 provides the calculated position information to the viewer controller 207. The viewer controller 207 transmits a request for acquiring an image corresponding to the display area to the image server 100 through the viewer communication unit 204.

The server controller 107 of the image server 100 receives that request through the server communication unit 108, and reads out the image data of the display area included in the request from the slide image accumulation unit 101. The server controller 107 transmits the read-out image data to the viewer 200 through the server communication unit 108.

The viewer controller 207 of the viewer 200 receives the image data of the display area through the viewer communication unit 204, and provides the received image data of the display area to the display processor 205. The display processor 205 outputs the display data for displaying the image data to the display unit 201, and causes the display unit 201 to display the image data in the observation display section 223 of the specimen area selection screen 220 (Step S202).

Using the input unit 202 such as a mouse, the user inputs an order for moving the image of the display area displayed in the observation display section 223 up, down, left, and right. The viewer controller 207 detects an input of a moving order into the input unit 202 by the user, and provides the detected moving order to the second coordinate calculation unit 206. Based on the moving order, the second coordinate calculation unit 206 calculates the position information of the display area at the moving destination. The second coordinate calculation unit 206 provides the calculated position information to the viewer controller 207. The viewer controller 207 transmits a request for acquiring an image corresponding to that display area to the image server 100 through the viewer communication unit 204.

After that, as in Step S202, the server controller 107 of the image server 100 reads out the corresponding image data from the slide image accumulation unit 101 in response to the request from the viewer 200, and transmits the corresponding image data to the viewer 200 through the server communication unit 108. With this, the viewer 200 acquires the image data of the display area at the moving destination, and updates the display contents of the display unit 201 (Step S203).

Using the input unit 202, the user inputs an order for moving the display to an image of a different specimen area from the image of the specimen area displayed in the observation display section 223. That input is performed by, for example, selecting a specimen area on the right or left next to the currently displayed specimen area among a group of thumbnail images displayed in the specimen area tray 222 (FIG. 15) of the specimen area selection screen 220. Alternatively, that input is performed by selecting a slide above or below the currently displayed slide among a group of thumbnail images displayed in the slide tray 221 (FIG. 15) of the specimen area selection screen 220. When the viewer controller 207 detects an input of a moving order into the input unit 202 by the user (Yes in Step 204), the viewer controller 207 determines whether the inputted specimen area at the moving destination is positioned on the right or left next to the currently displayed specimen area, or whether the slide at the moving destination is positioned above or below the currently displayed specimen area (Steps S205 and S206).

If the viewer controller 207 determines that the specimen area at the moving destination is positioned on the right next to the currently displayed specimen area or the slide at the moving destination is positioned below the currently displayed specimen area (Yes in Step 205), the viewer controller 207 increments the specimen area number of the specimen area being the display target. On the other hand, if the viewer controller 207 determines that the specimen area at the moving destination is positioned on the left next to the currently displayed specimen area or the slide at the moving destination is positioned above the currently displayed specimen area (Yes in Step 206), the viewer controller 207 decrements the specimen area number of the specimen area being the display target. With this, the obtained specimen area number becomes the specimen area number of the specimen area at the moving destination.

The viewer controller 207 informs the second coordinate calculation unit 206 of the specimen area number of the specimen area at the moving destination and the position information of the currently displayed display area (display area at moving source). The second coordinate calculation unit 206 reads out, from the offset coordinate storage unit 104, offset coordinates associated with the specimen area number at the moving destination. Further, the second coordinate calculation unit 206 reads out, from the alignment data storage unit 209, the alignment data for causing the specimen area at the moving destination to correspond to the specimen area at the moving source in the coordinate space. Then, based on the offset coordinates and the alignment data being the metadata, the second coordinate calculation unit 206 sets the display area in the specimen area at the moving destination corresponding to the display area at the moving source such that positions of corresponding points in the display areas at the moving source and the moving destination correspond to each other in the display areas.

Indeed, the positions of the point in the display area at the moving source (e.g., center point of display area) and the corresponding point of the display area at the moving destination may not correspond to each other in each display area. For example, even if a disease is present at the center of the display area at the moving source, the disease may be located at a position deviated from the center in the display area at the moving destination. In view of this, based on the alignment data, the second coordinate calculation unit 206 adjusts the display area at the moving destination such that positions of a certain point in the display area at the moving source and the corresponding point in the display area at the moving destination correspond to each other in the display areas (e.g., center of display area) (Step S207, S208).

The second coordinate calculation unit 206 calculates position information of the display area adjusted in Steps S207 to S208. The second coordinate calculation unit 206 provides the calculated position information to the viewer controller 207. The viewer controller 207 transmits a request for acquiring an image corresponding to that display area to the image server through the viewer communication unit 204.

After that, as in Step S202, in response to the request from the viewer 200, the server controller 107 of the image server 100 reads out the corresponding image data from the slide image accumulation unit 101, and transmits the corresponding image data to the viewer 200 through the server communication unit 108. With this, the viewer 200 acquires the image data of the display area at the moving destination, and updates the display contents of the display unit 201.

If, as a result of the above-mentioned calculations, the second coordinate calculation unit 206 determines that a specimen area to be next displayed is not present (Yes in Step 209), the second coordinate calculation unit 206 terminates the discrete display processing.

As mentioned above, the information processing system 1 according to this embodiment further includes the alignment data generation unit 208 that detects a feature point of each of the plurality of specimen areas, and calculates an offset amount of coordinates of the feature point in a coordinate space of the specimen areas, and the alignment data storage unit 209 that stores the calculated offset amount. When the viewer controller 207 receives, from the user, an instruction of jumping the display area to a different specimen area, the viewer controller 207 calculates, based on the stored position information and the stored offset amount, a display area at a jumping destination such that positions of the feature points correspond to each other in the display area before and after jumping.

That is, the alignment data generation unit 208 sets the display area based on the offset amount between the feature points included in the plurality of specimen areas that is the metadata, and hence the viewer controller 207 can cause the positions of the feature points to correspond to each other in the display area before and after jumping. Further, by using the metadata for setting the display area, it is possible to accurately calculate the corresponding display area and perform the display processing efficiently and at high speed.

In the information processing system 1 according to this embodiment, the alignment data generation unit 208 calculates an affine transformation matrix for causing the detected feature points in the plurality of specimen areas to correspond to each other in a display space, and calculates an offset amount based on the calculated affine transformation matrix.

By using the affine transformation matrix, it is possible to calculate an offset amount in the two axial directions. With this, it is possible to more accurately calculate the corresponding display area before and after jumping.

[3. Synchronous Display]

Next, the synchronous display will be described. In the synchronous display, processing for dividing a display screen and displaying the corresponding areas of the plurality of specimen areas in synchronization is performed.

FIG. 18 is a view showing a specific example of the synchronous display. In this synchronous display, a plurality of (e.g., four) specimen areas 621 to 624 are selected by the user as display targets. The plurality of specimen areas 621 to 624 are individually assigned and displayed in display spaces 651 to 654 obtained by dividing the observation display section 223 of the specimen area selection screen 220 (FIG. 15) into a plurality of areas having almost the same size. More specifically, the plurality of specimen areas 621 to 624 are displayed such that positions of points 621a to 624a respectively located at centers of the plurality of specimen areas 621 to 624 correspond to each other in the display spaces 651 to 654 (located at center).

Next, the synchronous display processing will be described in more detail.

Using the input unit 202, the user selects a slide being a display target from the slide tray 221 (FIG. 15) of the specimen area selection screen 220 displayed on the display unit 201, and selects a plurality of (e.g., four) specimen areas being display targets from the specimen area tray 222. The viewer controller 207 detects an input into the input unit 202 by the user, and determines a slide number and a plurality of specimen area numbers of the slide and the plurality of specimen areas to be displayed. Then, the viewer controller 207 provides the slide number and the plurality of specimen area numbers to the third coordinate calculation unit 210 that performs processing for the synchronous display. In addition, the viewer controller 207 divides the observation display section 223 of the specimen area selection screen 220 (FIG. 15) serving as the display space into display spaces as many as the plurality of (e.g., four) specimen areas specified. Then, the viewer controller 207 provides coordinate information of each of the divided display spaces to the third coordinate calculation unit 210.

Based on the offset coordinates associated with the specimen area number of the plurality of specimen areas being the display targets and on the alignment data for adjusting an offset between the plurality of specimen areas being the display targets, the third coordinate calculation unit 210 sets the display area such that the center points of the plurality of specimen areas correspond to each other. That is, based on the offset coordinates being the metadata and the alignment data, the third coordinate calculation unit 210 sets the display area such that the positions of points located at the centers of the plurality of specimen areas correspond to each other in the display spaces (located at center). The third coordinate calculation unit 210 calculates position information of each of the set display areas. The third coordinate calculation unit 210 provides the obtained position information to the viewer controller 207. The viewer controller 207 transmits a request for acquiring an image corresponding to that display area to the image server 100 through the viewer communication unit 204.

After that, as in Step S202 described above, the server controller 107 of the image server 100 reads out the corresponding image data from the slide image accumulation unit 101 in response to the request from the viewer 200, and transmits the corresponding image data to the viewer 200 through the server communication unit 108. With this, the viewer 200 acquires image data of the plurality of display areas and displays the image data on the display unit 201. Specifically, the viewer controller 207 divides the observation display section 223 of the specimen area selection screen 220 (FIG. 15) to be displayed on the display unit 201 into areas having almost the same size as many as the specimen areas to be displayed. Then, the display processor 205 individually assigns and displays the image data of the plurality of display areas in the display spaces obtained by dividing the observation display section 223 of the specimen area selection screen 220 (FIG. 15) displayed on the display unit 201 into the plurality of areas having almost the same size.

As mentioned above, in the information processing system 1 according to this embodiment, when the viewer controller 207 receives, from the user, specification of the plurality of specimen areas to be displayed in the acquired image data, the viewer controller 207 divides the display space into display spaces as many as the plurality of specimen areas specified. Then, based on the stored position information and the stored offset amount, the viewer controller 207 calculates a display area to be displayed in the plurality of display spaces such that positions of feature points to be displayed in the plurality of display spaces correspond to each other in the specimen areas.

That is, based on the offset amount between the feature points included in the plurality of specimen areas that is the metadata, the viewer controller 207 can cause the positions of the feature points in the specimen areas to be displayed in the plurality of display spaces to correspond to each other. Further, by using the metadata for setting the display area, it is possible to accurately calculate the corresponding display area and perform the display processing efficiently and at high speed.

[Typical Computer]

Next, a configuration of the typical computer that can be used for the image server 100 and the viewer 200 will be described.

FIG. 19 is a view showing a hardware configuration of a typical computer 400.

As shown in the figure, the computer 400 includes a CPU (Central Processing Unit) 401, a ROM (Read Only Memory) 402, and a RAM 403. Further, the computer 400 includes an input apparatus 404, an output apparatus 405, a storage apparatus 406, a medium interface apparatus 407, a network connection apparatus 408, and a bus 409 that connect them.

The CPU 401 functions as an arithmetic processing apparatus and a control apparatus and controls general operations of the computer 400 according to various programs. The ROM 402 stores programs, arithmetic parameters, and the like to be used by the CPU 401. The RAM 403 temporarily stores programs to be executed by the CPU 401, parameters appropriately changing in execution thereof, and the like.

A synchronous processor 25 of a synchronous server 40, viewer controllers 37A and 37B of viewers 30A and 30B, and the like are realized by the CPU 401, the programs stored in the ROM 402, a working area of the RAM 403, and the like in the hardware configuration of the computer 400, for example.

The input apparatus 404 is constituted of an input means for the user to input information, such as a mouse, a keyboard, a touch panel, a button, a microphone, a switch, and a lever, an input control circuit that generates an input signal based on an input by the user and outputs the input signal to the CPU 401, and the like. By operating the input apparatus 404, the user of the computer 400 can input various types of data into the CPU 401 and instruct the CPU 401 to execute processing operations.

The output apparatus 405 includes a display apparatus, for example, a CRT (Cathode Ray Tube) display apparatus, a crystal-liquid display (LCD) apparatus, or an OLED (Organic Light Emitting Diode) apparatus. The output apparatus 405 further includes an audio output apparatus such as a speaker and headphones. The storage apparatus 406 is an apparatus for storing programs and user data. The storage apparatus 406 is constituted of a recording medium, a reading/writing apparatus that reads/writes data from/on the recording medium, and the like. The storage apparatus 106 is constituted of, for example, an HDD (Hard Disk Drive), an SSD (Solid State Drive), and the like.

The medium interface apparatus 407 is a reader/writer for the recording medium. The medium interface apparatus 407 reads/writes data from/on a removable recording medium 2A such as a magnetic disc, an optical disc, a magneto-optical disc, and a semiconductor memory installed therein.

The network connection apparatus 408 is an interface for connecting to the network 300, for example. The network connection apparatus 408 may be an apparatus adapted for a wireless LAN (Local Area Network), a wireless USB-adapted apparatus, or a wired communication apparatus that performs a communication via a wire.

MODIFIED EXAMPLE

FIG. 20 is a view showing a configuration of an information processing apparatus according to a modified example.

In the above embodiment, the information processing system 1 including the image server 100 and the one or more viewers 200A and 200B that can be connected to one another over the network 300 has been described. Otherwise, a single information processing apparatus 500 may be adopted as the information processing system. The information processing apparatus 500 has the same configurations as the functional configurations of the image server 100 and the viewer 200 according to the above embodiment. The information processing apparatus 500 is different from the above embodiment in that the information processing apparatus 500 does not include the server controller 107, the server communication unit 108, and the viewer communication unit 204. In addition, a controller 207A has the same function as the viewer controller 207 according to the above embodiment. The controller 207A reads out data directly from the slide image accumulation unit 101, the thumbnail image storage unit, the offset coordinate storage unit 104, and the triangle and matrix storage unit 106. The information processing apparatus 500 may be constituted of, for example, the above-mentioned typical computer 400. Also, this information processing apparatus 500 can perform similar processing as the above embodiment.

It should be noted that the present technology may also employ the following configurations.

(1) An information processing system, including:

An acquisition unit to acquire image data obtained by capturing a slide on which a plurality of sections obtained by cutting a single specimen in the same direction are discretely placed;

a detector to detect a plurality of specimen areas in the acquired image data and to calculate position information relatively indicating positions of the individual specimen areas in a coordinate space of the image data, the plurality of specimen areas having the same shape and including the individual sections;

a first storage unit to store the calculated position information; and a controller to switch display between the specimen areas based on the stored position information.

(2) The information processing system according to Item (1), further including a generator to generate reduced data by reducing a resolution of the image data, in which the detector detects the plurality of specimen areas in the image data by detecting the plurality of specimen areas from the reduced data.

(3) The information processing system according to Item (1) or (2), in which a plurality of image data items of the plurality of specimen areas are managed in a cutting order, and the controller calculates, when the controller receives, from a user, specification of the specimen area to be displayed in the acquired image data and a range in the specimen area, the range in the specified specimen area as a display area, and switches, when the display area is located at an end of the specimen area and the controller receives, from the user, an instruction for moving the display area outside the end, to display the neighbor specimen area in the cutting order based on the stored position information.

(4) The information processing system according to any one of Items (1) to (3), in which the controller switches, when the calculated display area is located at an end of the specimen area in one axial direction of the plurality of specimen areas in the coordinate space of the image data and the controller receives, from the user, an instruction for moving the display area outside the end in the one axial direction, to display a neighbor specimen area in the cutting order while fixing a position in the other axial direction.

(5) The information processing system according to any one of Items (1) to (4), in which the acquisition unit acquires image data obtained by capturing a slide on which a plurality of sections obtained by cutting a single specimen in the same direction are arranged and placed discretely and in one row, and the controller calculates, when the calculated display area is located at an end of the specimen area in an arrangement direction of the plurality of specimen areas in a coordinate space of the image data and the controller receives, from a user, an instruction for moving the display area beyond the end in the arrangement direction, a display area of the specimen area in the moving destination based on the stored position information.

(6) The information processing system according to any one of Items (1) to (5), further including:

an alignment unit to detect feature points of the plurality of specimen areas and to calculate an offset amount between coordinates of the feature points in a coordinate space of the specimen area; and a second storage unit to store the calculated offset amount, in which the controller calculates, when the controller receives, from a user, an instruction for jumping the display area to another specimen area, the display area at a jumping destination based on the stored position information and the stored offset amount such that positions of the feature points correspond to each other in the display area before and after jumping.

(7) The information processing system according to any one of Items (1) to (6), in which the alignment unit calculates an affine transformation matrix for causing the detected feature points in the plurality of specimen areas to correspond to each other in a display space, and calculates the offset amount based on the calculated affine transformation matrix.

(8) The information processing system according to any one of Items (1) to (7), in which the controller divides, when the controller receives, from a user, specification of a plurality of specimen areas to be displayed in the obtained image data, a display space into display spaces as many as the plurality of specified specimen areas, and calculates, based on the stored position information and the stored offset amount, the display area to be displayed in the plurality of display spaces such that positions of the feature points in the specimen areas to be displayed in the plurality of display spaces correspond to each other.

(9) An information processing method, including:

acquiring, by an acquisition unit, image data obtained by capturing a slide on which a plurality of sections obtained by cutting a single specimen in the same direction are discretely placed;

detecting, by a detector, a plurality of specimen areas in the acquired image data and calculating position information relatively indicating positions of the individual specimen areas in a coordinate space of the image data, the plurality of specimen areas having the same shape and including the individual sections;

storing, by a first storage unit, the calculated position information; and switching, by a controller, display between the specimen areas based on the stored position information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF SYMBOLS 1 information processing system
103 specimen area detector
104 offset coordinate storage unit
109 image acquisition unit
207 viewer controller

The invention claimed is:

1. An information processing system, comprising:
an acquisition unit to acquire image data obtained by capturing a slide on which a plurality of sections obtained by cutting a single specimen in the same direction are discretely placed;
a detector to detect a plurality of specimen areas in the acquired image data, to determine degrees of similarity among images of the plurality of specimen areas, to perform grouping such that the specimen areas having a high degree of similarity are located close to each other, to set a specimen area number based on the grouping of the specimen areas, and to calculate position information relatively indicating positions of the individual specimen areas in a coordinate space of the image data, the plurality of specimen areas having the same shape and including the individual sections;
a first storage unit to store the calculated position information and the specimen area number; and
one or more viewers connected to one another over a network, each viewer including a controller to switch display between the specimen areas based on the stored position information of each specimen area and the specimen area number.

2. The information processing system according to claim 1, further comprising
a generator to generate reduced data by reducing a resolution of the image data, wherein
the detector detects the plurality of specimen areas in the image data by detecting the plurality of specimen areas from the reduced data.

3. The information processing system according to claim 2, wherein
a plurality of image data items of the plurality of specimen areas are managed in a cutting order, and
the controller calculates, when the controller receives, from a user, specification of the specimen area to be displayed in the acquired image data and a range in the specimen area, the range in the specified specimen area as a display area, and switches, when the display area is located at an end of the specimen area and the controller receives, from the user, an instruction for moving the display area outside the end, to display the neighbor specimen area in the cutting order based on the stored position information.

4. The information processing system according to claim 3, wherein
the controller switches, when the calculated display area is located at an end of the specimen area in one axial direction of the plurality of specimen areas in the coordinate space of the image data and the controller receives, from the user, an instruction for moving the display area outside the end in the one axial direction, to display a neighbor specimen area in the cutting order while fixing a position in the other axial direction.

5. The information processing system according to claim 4, wherein
the acquisition unit acquires image data obtained by capturing a slide on which a plurality of sections obtained by cutting a single specimen in the same direction are arranged and placed discretely and in one row, and
the controller calculates, when the calculated display area is located at an end of the specimen area in an arrangement direction of the plurality of specimen areas in a coordinate space of the image data and the controller receives, from a user, an instruction for moving the display area beyond the end in the arrangement direction, a display area of the specimen area in the moving destination based on the stored position information.

6. The information processing system according to claim 5, further comprising:
an alignment unit to detect feature points of the plurality of specimen areas and to calculate an offset amount between coordinates of the feature points in a coordinate space of the specimen area; and
a second storage unit to store the calculated offset amount, wherein
the controller calculates, when the controller receives, from a user, an instruction for jumping the display area to another specimen area, the display area at a jumping destination based on the stored position information and the stored offset amount such that positions of the feature points correspond to each other in the display area before and after jumping.

7. The information processing system according to claim 6, wherein the alignment unit calculates an affine transformation matrix for causing the detected feature points in the plurality of specimen areas to correspond to each other in a display space, and calculates the offset amount based on the calculated affine transformation matrix.

8. The information processing system according to claim 7, wherein the controller divides, when the controller receives, from a user, specification of a plurality of specimen areas to be displayed in the obtained image data, a display space into display spaces as many as the plurality of specified specimen areas, and calculates, based on the stored position information and the stored offset amount, the display area to be displayed in the plurality of display spaces such that positions of the feature points in the specimen areas to be displayed in the plurality of display spaces correspond to each other.

9. An information processing method in an information processing system, comprising:
- acquiring, by an acquisition unit, image data obtained by capturing a slide on which a plurality of sections obtained by cutting a single specimen in the same direction are discretely placed;
- detecting, by a detector, a plurality of specimen areas in the acquired image data, determining degrees of similarity among images of the plurality of specimen areas, performing grouping such that the specimen areas having a high degree of similarity are located close to each other, setting a specimen area number based on the grouping of the specimen areas, and calculating position information relatively indicating positions of the individual specimen areas in a coordinate space of the image data, the plurality of specimen areas having the same shape and including the individual sections;
- storing, by a first storage unit, the calculated position information and the specimen area number; and
- switching, by a controller, display between the specimen areas based on the stored position information and the specimen area number.

* * * * *